(12) United States Patent
Ganatra et al.

(10) Patent No.: US 8,253,695 B2
(45) Date of Patent: Aug. 28, 2012

(54) EMAIL CLIENT FOR A PORTABLE MULTIFUNCTION DEVICE

(75) Inventors: Nitin K. Ganatra, San Jose, CA (US);
Gregory Novick, Santa Clara, CA (US);
Stephen O. Lemay, San Francisco, CA (US); Greg Christie, San Jose, CA (US);
Scott Forstall, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 993 days.

(21) Appl. No.: 11/850,630

(22) Filed: Sep. 5, 2007

(65) Prior Publication Data
US 2008/0094369 A1 Apr. 24, 2008

Related U.S. Application Data

(60) Provisional application No. 60/937,993, filed on Jun. 29, 2007, provisional application No. 60/879,469, filed on Jan. 8, 2007, provisional application No. 60/883,807, filed on Jan. 7, 2007, provisional application No. 60/879,253, filed on Jan. 7, 2007, provisional application No. 60/824,769, filed on Sep. 6, 2006.

(51) Int. Cl.
*G06F 3/041* (2006.01)
(52) U.S. Cl. ........................................ 345/173; 715/863
(58) Field of Classification Search .......... 345/156–184;
715/700–866, 243–245; 710/1–74;
178/18.01–19.07
See application file for complete search history.

(56) References Cited

U.S. PATENT DOCUMENTS

| 5,347,295 | A | * | 9/1994 | Agulnick et al. | ............. 345/156 |
| 5,835,084 | A | * | 11/1998 | Bailey et al. | ................... 715/783 |
| 5,917,483 | A | * | 6/1999 | Duncan et al. | ................. 715/802 |
| 6,088,696 | A | | 7/2000 | Moon et al. | ..................... 707/10 |
| 7,877,703 | B1 | * | 1/2011 | Fleming | ......................... 715/800 |

(Continued)

FOREIGN PATENT DOCUMENTS
EP 1 674 977 A2 6/2006

OTHER PUBLICATIONS

International Search Report and Written Opinion for International Application PCT/US2007/077771, mailed Jun. 11, 2008.

(Continued)

*Primary Examiner* — Liliana Cerullo
(74) *Attorney, Agent, or Firm* — Morgan, Lewis & Bockius LLP

(57) ABSTRACT

A computer-implemented method for providing email at a portable communications device with a touch screen display is disclosed. A first portion of a list of entries with information about corresponding electronic messages is displayed in a first area of the touch screen display. A first portion of an electronic message that corresponds to an entry in the list of entries is displayed in a second area of the touch screen display that is separate from the first area. In response to a first gesture by a user in the first area of the touch screen display, the list of entries is scrolled to display a second portion of the list of entries. In response to a second gesture by the user in the second area of the touch screen display, the electronic message is moved in two dimensions to display a second portion of the electronic message.

24 Claims, 28 Drawing Sheets

U.S. PATENT DOCUMENTS

| | | | |
|---|---|---|---|
| 2004/0021676 A1* | 2/2004 | Chen et al. | 345/684 |
| 2005/0005235 A1* | 1/2005 | Satterfield et al. | 715/519 |
| 2005/0160372 A1* | 7/2005 | Gruen et al. | 715/810 |
| 2006/0026521 A1 | 2/2006 | Hotelling et al. | 715/702 |
| 2006/0047811 A1 | 3/2006 | Lau et al. | 709/225 |
| 2006/0123360 A1* | 6/2006 | Anwar et al. | 715/810 |
| 2006/0125803 A1* | 6/2006 | Westerman et al. | 345/173 |
| 2006/0250834 A1* | 11/2006 | Chinn et al. | 365/63 |
| 2007/0011258 A1* | 1/2007 | Khoo | 709/206 |
| 2008/0034381 A1 | 2/2008 | Jalon et al. | 719/329 |
| 2008/0086703 A1* | 4/2008 | Flynt et al. | 715/853 |

OTHER PUBLICATIONS

Block, R., "The iPhone's Long-Missing Two-Pane Email Client," Jan. 18, 2008, 8 pages, http://www.ryanblock.com/2008/01/the-iphones-long-missing-two-pane-email-client/.

Comer et al. "Conversation-Based Mail," ACM Transactions on Computer Systems, vol. 4, No. 4, Nov. 1986, pp. 299-319.

Jordan, M., "Quick Look in Leopard," Mac Tips, Nov. 7, 2007, 6 pages, http://mactips.info/tips/2007/11/quick-look-in-leopard.

Padilla, A., Palm Treo 750 Cell Phone Review-Messaging, published Mar. 17, 2007, 6 pages, http://www.wirelessinfo.com/content/palm-Treo-750-Cell-Phone-Review/Messaging.html.

Apple.com, "MailCoaster," 1 page, Feb. 7, 2008, http://www.apple.com/webapps/productivity/mailcoaster.ht.

Tidwell, J., "Animated Transition," from Designing Interfaces, O'Reilly Media, Inc., Nov. 2005, pp. 84-85.

Tidwell, J., "Two-Panel Selector," from Designing Interfaces, O'Reilly Media, Inc., Nov. 2005, pp. 31-33.

Tidwell, J., "UI Patterns and Techniques, Overview Plus Detail," from Designing Interfaces, O'Reilly Media, Inc., Nov. 2005, pp. 174-175.

Wikipedia, "Mail (application)," Wikipedia, the free encyclopedia, 3 pages, published Sep. 3, 2009, http://en.wikipedia.org/wiki/Apple_Mail.

* cited by examiner

EMAIL CLIENT FOR A PORTABLE MULTIFUNCTION DEVICE

RELATED APPLICATIONS

This application claims priority to U.S. Provisional Patent Application Nos. 60/937,993, "Portable Multifunction Device," filed Jun. 29, 2007; 60/879,469, "Portable Multifunction Device," filed Jan. 8, 2007; 60/883,807, "Email Client for a Portable Multifunction Device," filed Jan. 7, 2007; 60/879,253, "Portable Multifunction Device," filed Jan. 7, 2007; and 60/824,769, "Portable Multifunction Device," filed Sep. 6, 2006. All of these applications are incorporated by referenced herein in their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; and (10) U.S. patent application Ser. No. 11/367,749, "Multi-Functional Hand-Held Device," filed Mar. 3, 2006. All of these applications are incorporated by reference herein.

TECHNICAL FIELD

The disclosed embodiments relate generally to portable electronic devices, and more particularly, to email clients on portable communication devices.

BACKGROUND

As portable electronic devices become more compact, and the number of functions performed by a given device increases, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

In particular, many conventional user interfaces for displaying, organizing, managing, and creating emails on a portable communication device are inflexible. The combination of small screens for displaying emails and email lists, complicated pushbutton key sequences, and complex menu hierarchies results in email user interfaces that are not user-friendly. As a result, using an email client on a portable communication device can be frustrating.

Accordingly, there is a need for portable multifunction devices with more transparent and intuitive user interfaces for displaying, organizing, managing, and creating emails that are easy to use, configure, and/or adapt.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, in addition to emailing, the functions may include telephoning, video conferencing, instant messaging, blogging, digital photographing, digital videoing, web browsing, digital music playing, and/or digital video playing. Instructions for performing these functions may be included in a computer readable storage medium or other computer program product configured for execution by one or more processors.

In accordance with some embodiments of the present invention, a computer-implemented method for displaying electronic messages and lists of electronics messages at a portable communications device with a touch screen display is disclosed. A first portion of a list of entries with information about corresponding electronic messages is displayed in a first area of the touch screen display. A first portion of an electronic message that corresponds to an entry in the list of entries is displayed in a second area of the touch screen display that is separate from the first area. In response to a first gesture by a user in the first area of the touch screen display, the list of entries is scrolled to display a second portion of the list of entries. In response to a second gesture by the user in the second area of the touch screen display, the electronic message is moved in two dimensions to display a second portion of the electronic message.

In accordance with some embodiments of the present invention, a graphical user interface on a portable communications device with a touch screen display is disclosed. A first area of the touch screen display displays a first portion of a list of entries with information about corresponding electronic messages. A second area of the touch screen display, which is separate from the first area, displays a first portion of an electronic message that corresponds to an entry in the list of entries. In response to a first gesture by a user in the first area of the touch screen display, the list of entries is scrolled to display a second portion of the list of entries. In response to a second gesture by the user in the second area of the touch screen display, the electronic message moves in two dimensions to display a second portion of the electronic message.

In accordance with some embodiments of the present invention, a portable communications device is disclosed, comprising a touch screen display, one or more processors, memory, and a program, wherein the program is stored in the memory and configured to be executed by the one or more processors. The program includes instructions for displaying, in a first area of the touch screen display, a first portion of a list of entries with information about corresponding electronic messages. The program includes instructions for displaying, in a second area of the touch screen display that is separate from the first area, a first portion of an electronic message that corresponds to an entry in the list of entries. The program includes instructions for scrolling the list of entries, in response to a first gesture by a user in the first area of the touch screen display, to display a second portion of the list of entries and includes instructions for moving the electronic message in two dimensions, in response to a second gesture by the user in the second area of the touch screen display, to display a second portion of the electronic message.

In accordance with some embodiments of the present invention, a computer-program product is disclosed, comprising a computer readable storage medium and a computer program mechanism (e.g., one or more computer programs) embedded therein. The computer program mechanism comprises instructions, which when executed by a portable communications device with a touch screen display, cause the device to display, in a first area of the touch screen display, a first portion of a list of entries with information about corresponding electronic messages and cause the device to display, in a second area of the touch screen display that is separate from the first area, a first portion of an electronic message that corresponds to an entry in the list of entries. The instructions also cause the device to scroll the list of entries, in response to a first gesture by a user in the first area of the touch screen display, to display a second portion of the list of entries and cause the device to move the electronic message in two dimensions, in response to a second gesture by the user in the second area of the touch screen display, to display a second portion of the electronic message.

In accordance with some embodiments of the present invention, a portable communications device with a touch screen display is disclosed. The device comprises means for displaying, in a first area of the touch screen display, a first portion of a list of entries with information about corresponding electronic messages and means for displaying, in a second area of the touch screen display that is separate from the first area, a first portion of an electronic message that corresponds to an entry in the list of entries. The device also comprises means for scrolling the list of entries, in response to a first gesture by a user in the first area of the touch screen display, to display a second portion of the list of entries and means for moving the electronic message in two dimensions, in response to a second gesture by the user in the second area of the touch screen display, to display a second portion of the electronic message.

The disclosed email client for a portable multifunction device provides transparent and intuitive user interfaces for displaying, organizing, managing, and creating emails that are easy to use, configure, and/or adapt. The disclosed device thus reduces the frustrations involved with using portable electronic devices for email.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
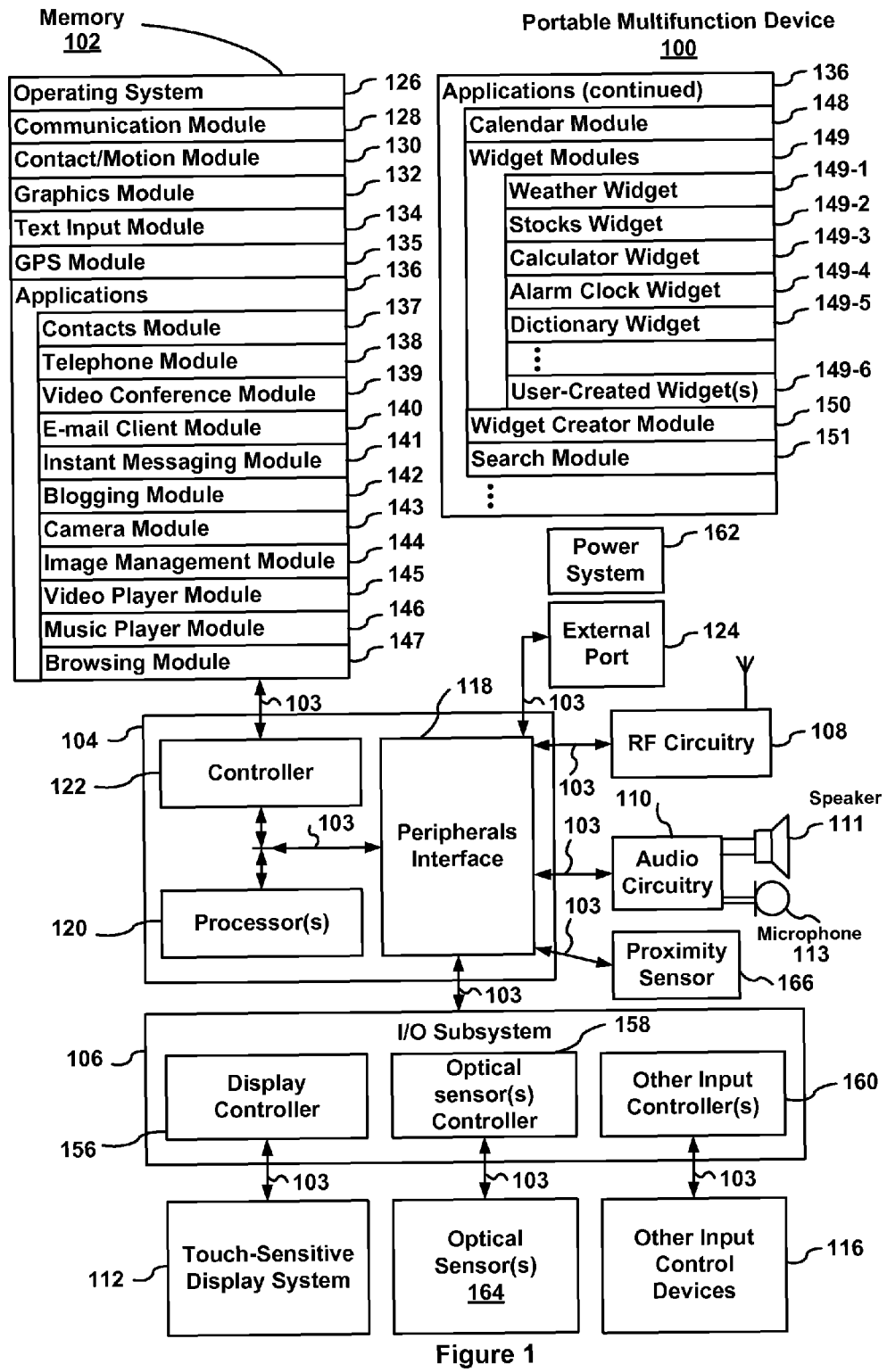
FIG. 1 is a block diagram illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

In some embodiments, in addition to the email application, the device supports a variety of applications, such as one or more of the following: a telephone application, a video conferencing application, an instant messaging application, a blogging application, a photo management application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the device. FIG. 1 is a block diagram illustrating a portable multifunction device 100 with a touch-sensitive display 112 in accordance with some embodiments. The touch-sensitive display 112 is sometimes called a "touch screen" for convenience. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. A touch-sensitive display in some embodiments of the touch screen 112 may be analogous to the multi-touch sensitive tablets described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen 112 displays visual output from the portable device 100, whereas touch sensitive tablets do not provide visual output. The touch screen 112 may have a resolution in excess of 100 dpi. In an exemplary embodiment, the touch screen in the display system has a resolution of approximately 168 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

A touch-sensitive display in some embodiments of the touch screen 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector in Handheld Device," filed Sep. 30, 2005, and Ser. No. 11/240,788, "Proximity Detector in Handheld Device, filed Sep. 30, 2005, which are hereby incorporated by reference. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel 116.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, email client 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
    a contacts module 137 (sometimes called an address book or contact list);
    a telephone module 138;
    a video conferencing module 139;
    an email client module 140;
    an instant messaging (IM) module 141;
    a blogging module 142;
    a camera module 143 for still and/or video images;
    an image management module 144;
    a video player module 145;
    a music player module 146;

a browser module 147;

a calendar module 148;

widget modules 149, which may include weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6; and/or search module 151.

Examples of other applications 136 that may be stored in memory 102 include memo pad and other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), email address(es), physical address(es) or other information with a name; associating an image with a name; categorizing and sorting names; providing telephone numbers or email addresses to initiate and/or facilitate communications by telephone 138, video conference 139, email client 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the email client module 140 may be used to create, send, receive, and manage email. In conjunction with image management module 144, the email module 140 makes it very easy to create and send emails with still or video images taken with camera module 143. Embodiments of user interfaces and associated processes using email module 140 are described further below.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol), to receive instant messages and to view received instant messages. In some embodiments, transmitted and/or received instant messages may include graphics, photos, audio files, video files and/or other attachments as are supported in a MMS and/or an Enhanced Messaging Service (EMS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, email module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
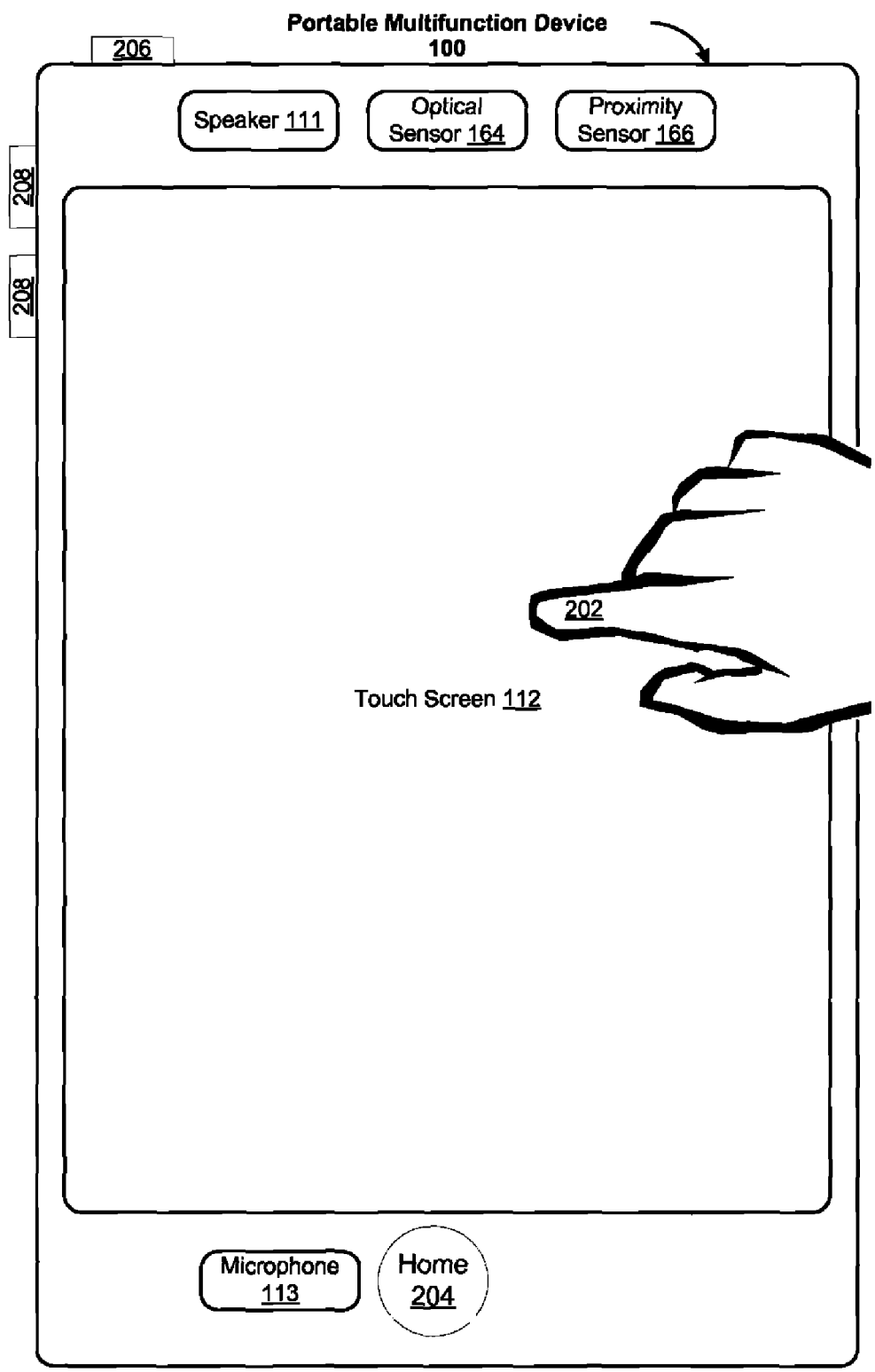
FIG. 2 illustrates a portable multifunction device having a touch screen display in accordance with some embodiments.

FIG. 2 illustrates a portable multifunction device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, and volume adjustment button(s) 208. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
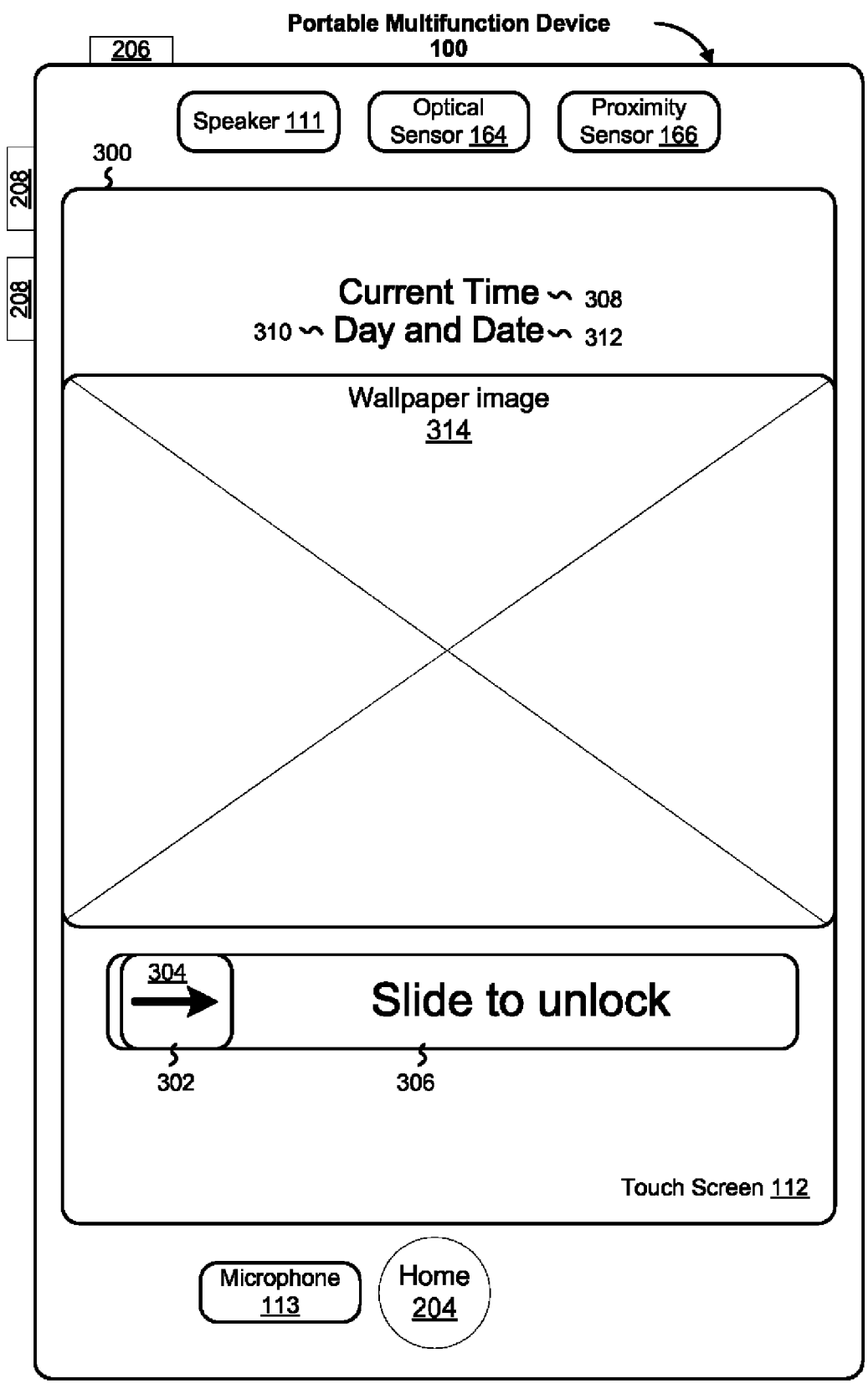
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking a Device by Performing Gestures on an Unlock Image," filed Dec. 23, 2005, which is hereby incorporated by reference.

Figure 4:
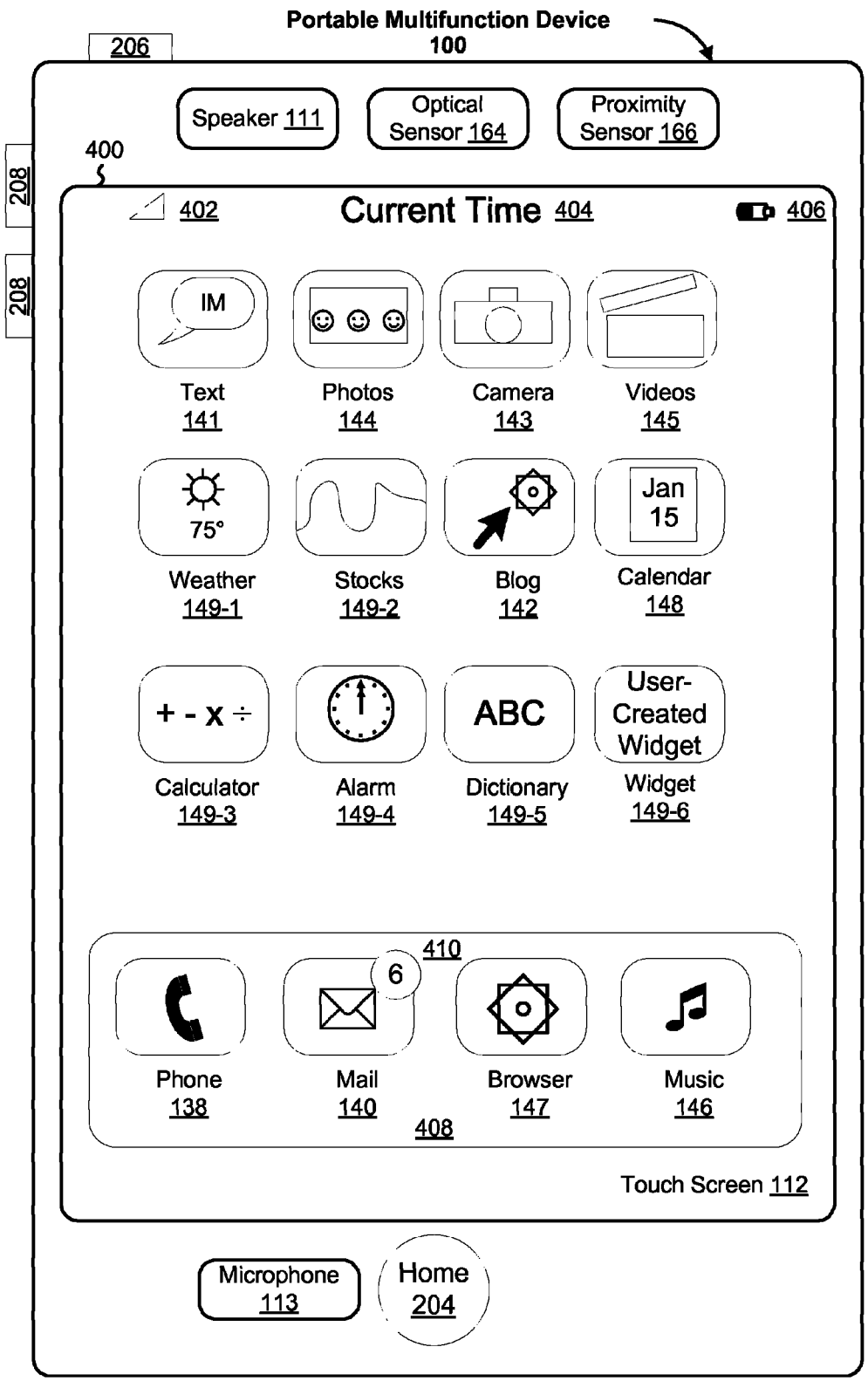
FIG. 4 illustrates an exemplary user interface for a menu of applications on a portable multifunction device in accordance with some embodiments.

FIG. 4 illustrates an exemplary user interface for a menu of applications on a portable multifunction device in accordance with some embodiments. In some embodiments, user interface 400 includes the following elements, or a subset or superset thereof:

Signal strength indicator 402 for wireless communication;
Time 404;
Battery status indicator 406;
Tray 408 with icons for frequently used applications, such as:
　Phone 138;
　Email client 140, which may include an indicator 410 of the number of unread emails;
　Browser 147; and
　Music player 146; and
Icons for other applications, such as:
　IM 141;
　Image management 144;
　Camera 143;
　Video player 145;
　Weather 149-1;
　Stocks 149-2;
　Blog 142;
　Calendar 148;
　Calculator 149-3;
　Alarm clock 149-4;
　Dictionary 149-5; and
　User-created widget 149-6.

In some embodiments, UI 400 displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400 provides integrated access to both widget-based applications and non-widget-based applications. In some embodiments, all of the widgets, whether user-created or not, are displayed in UI 400. In other embodiments, activating the icon for user-created widget 149-6 may lead to another UI (not shown) that contains the user-created widgets or icons corresponding to the user-created widgets.

In some embodiments, a user may rearrange the icons in UI 400, e.g., using processes described in U.S. patent application Ser. No. 11/459,602, "Portable Electronic Device With Interface Reconfiguration Mode," filed Jul. 24, 2006, which is hereby incorporated by reference. For example, a user may move application icons in and out of tray 408 using finger gestures.

In some embodiments, UI 400 includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference.

Figure 5:
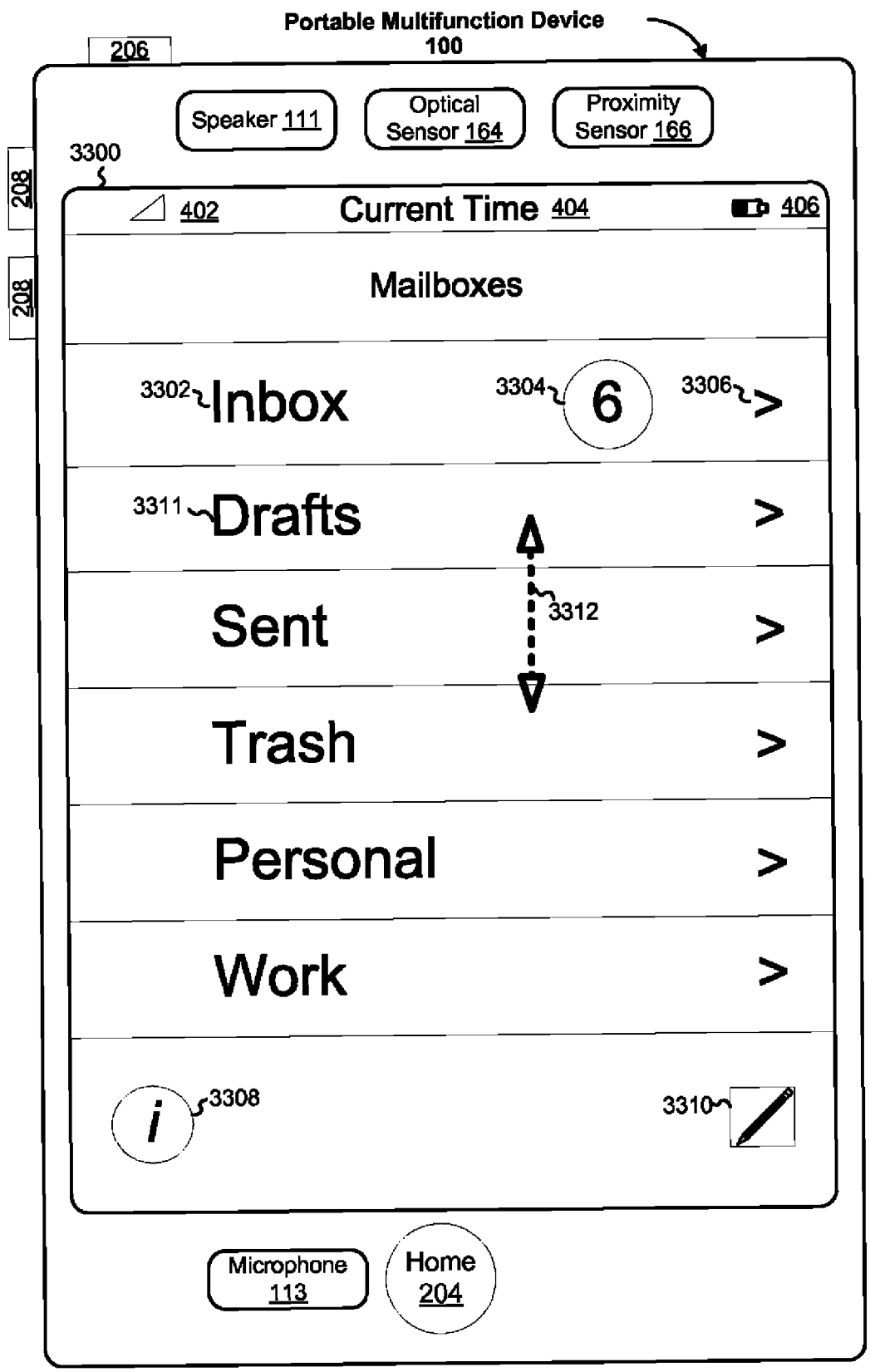
FIG. 5 illustrates an exemplary user interface for organizing and managing email in accordance with some embodiments.

FIG. 5 illustrates an exemplary user interface for organizing and managing email in accordance with some embodiments. In some embodiments, user interface 3300 includes the following elements, or a subset or superset thereof:
- 402, 404, and 406, as described above;
- a set of mailboxes, such as inbox 3302, which may be organized in rows with a selection icon 3306 for each row, and which may include indicator(s) 3304 of the number of unread emails for a given mailbox;
- a settings icon 3308 that when activated (e.g., by a finger tap on the icon) initiates display of a UI to input mailbox settings (e.g. UI 3600, FIG. 8); and
- a create email icon 3310 that when activated (e.g., by a finger tap on the icon) initiates display of a UI for creating a new email message (e.g. UI 3400, FIG. 6).

If the set of mailboxes fills more than the screen area, the user may scroll through the mailboxes using vertically upward and/or vertically downward gestures 3312 on the touch screen.

FIGS. 6A-6E illustrate exemplary user interfaces for creating emails in accordance with some embodiments.

In response to the user activating create email icon 3310 (FIG. 5), the device displays UI 3400A. In some embodiments, if the user makes a tap or other predefined gesture on the subject line 3408 or in the body of the email 3412 (FIG. 6A), a letter keyboard 616 appears and the user may input the subject and/or body text (FIG. 6B).

Figure 6A:
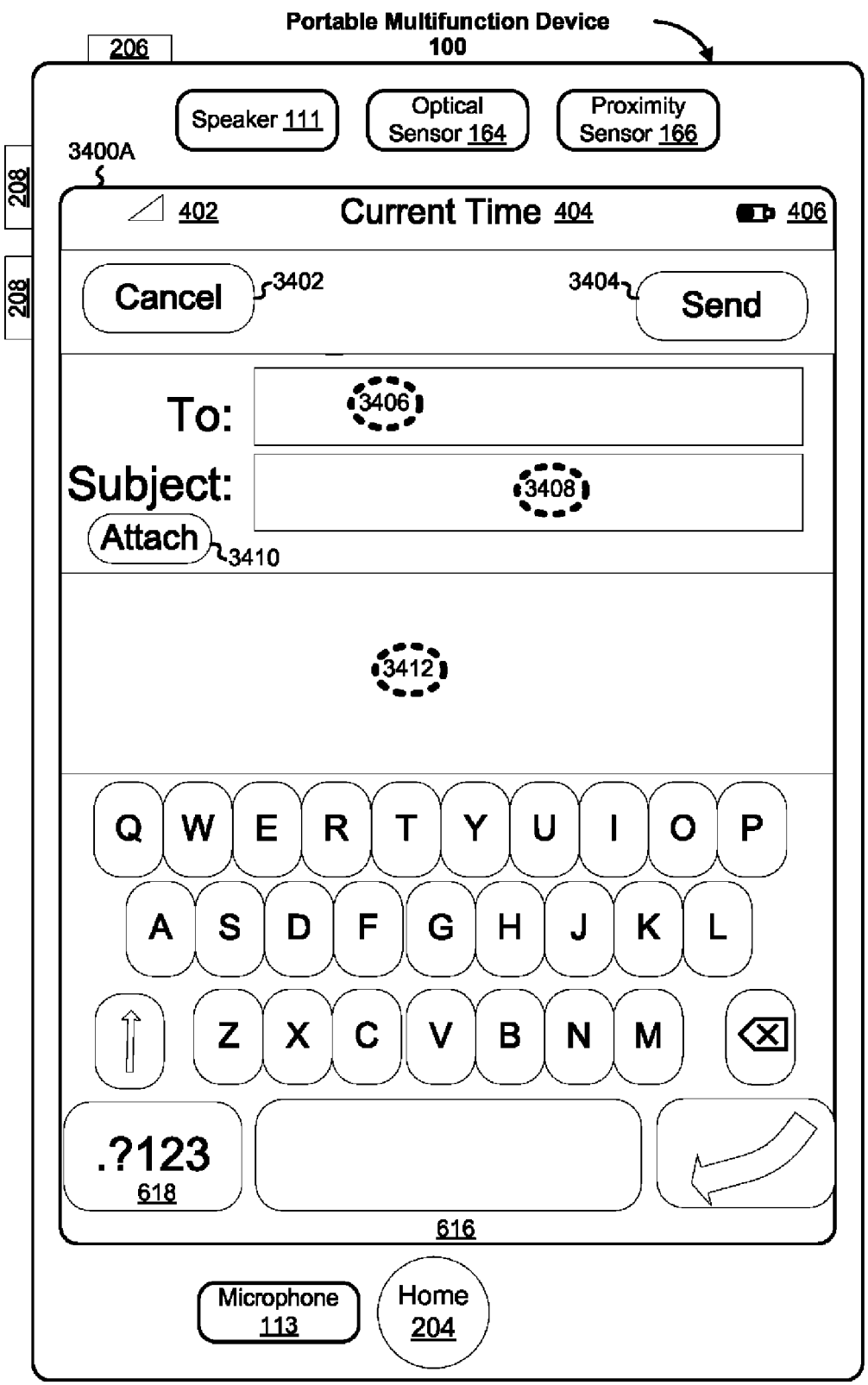
FIGS. 6A-6E illustrate an exemplary user interface for creating emails in accordance with some embodiments.
Figure 6B:
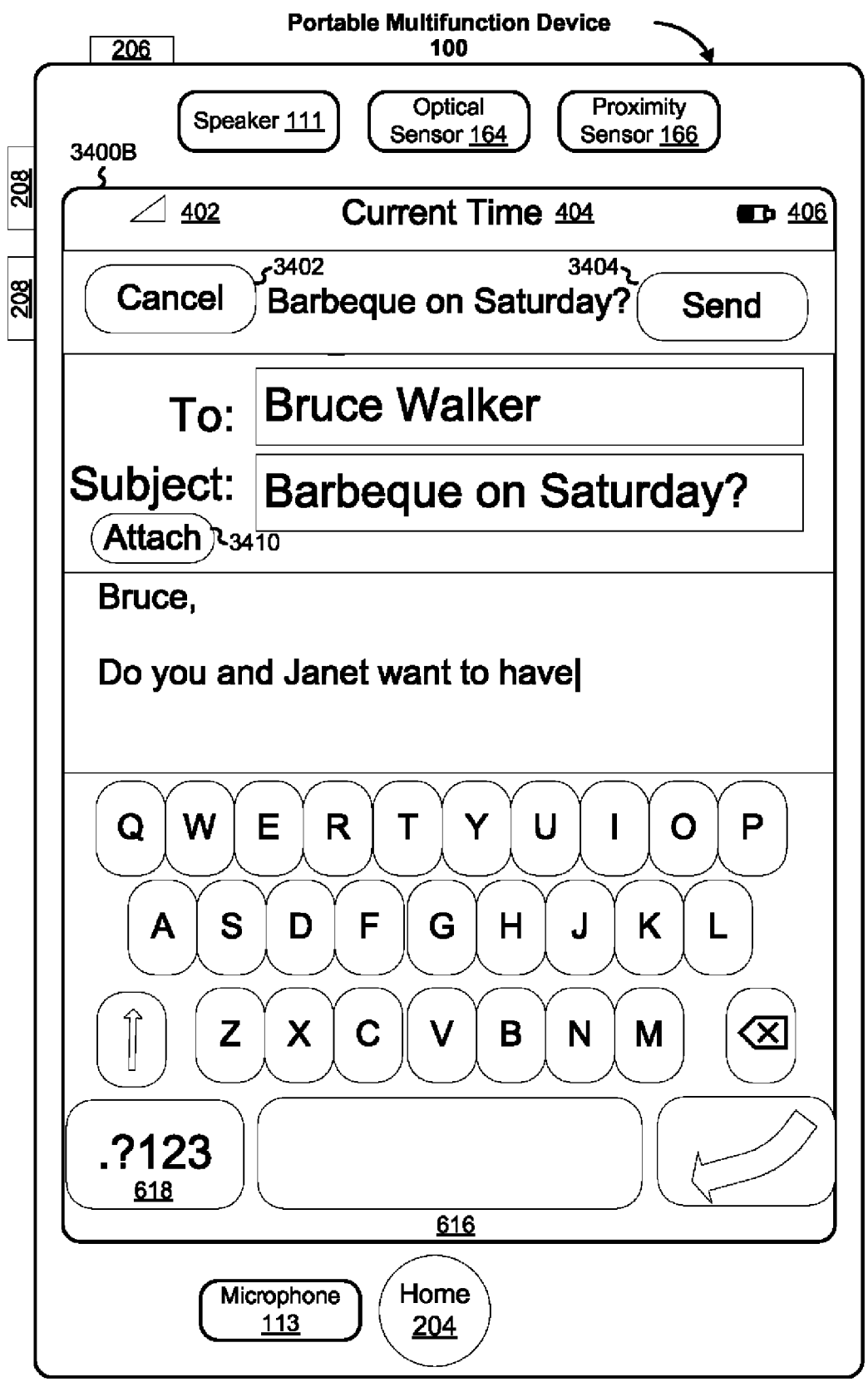
Figure 6C:
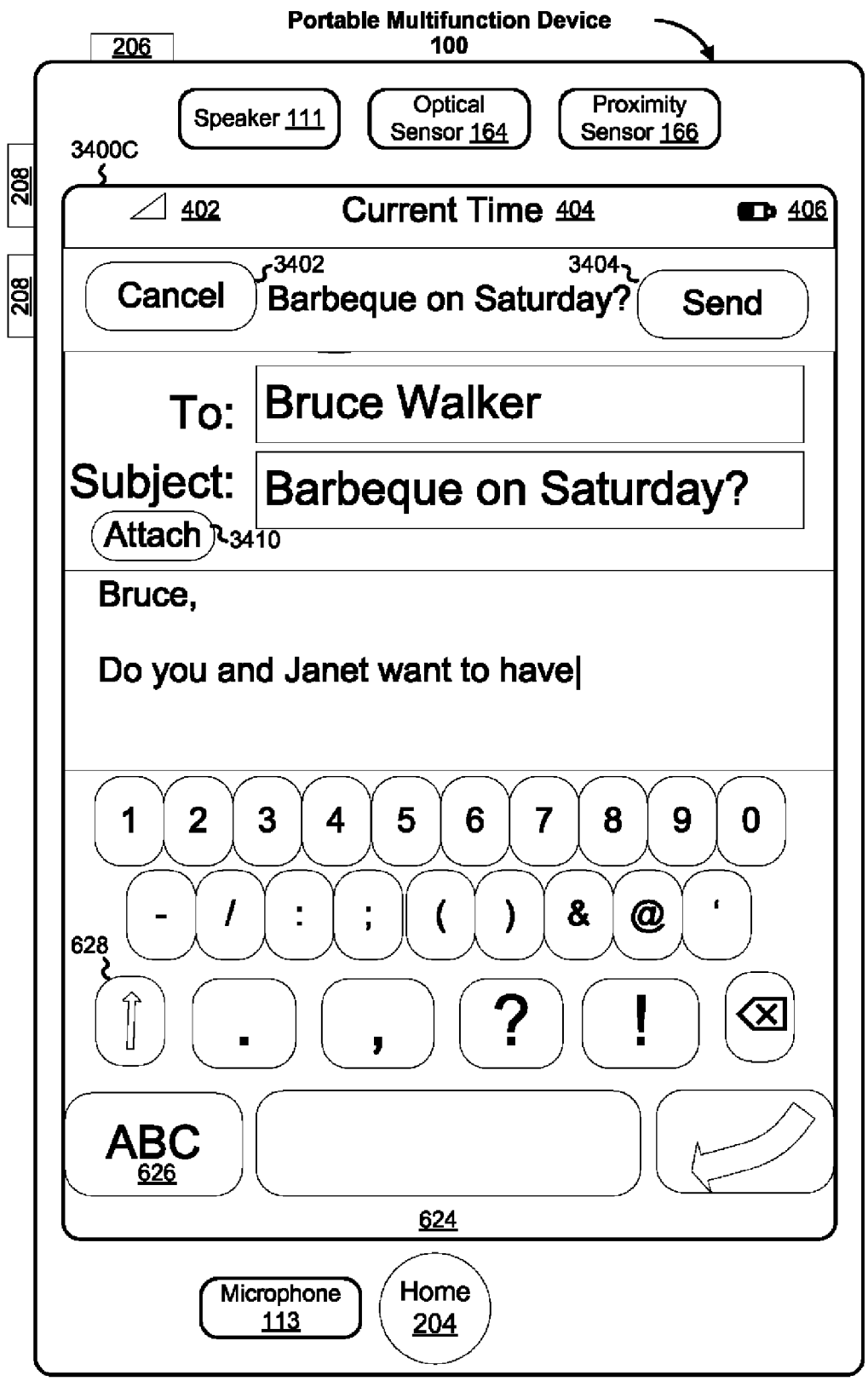

In some embodiments, to enter the email address, the user makes a tap or other predefined gesture on the To: line 3406 of the email; the user's contact list appears (FIG. 6E); the user makes a tap or other predefined gesture on the desired recipient/contact; and the device places the corresponding email address in the email message (FIG. 6B). In some embodiments, contact list user interface 3400E includes the following elements, or a subset or superset thereof:
- 402, 404, 406, as described above;
- Groups icon 802 that when activated (e.g., by a finger tap on the icon) initiates display of groups of contacts;
- First name icon 804 that when activated (e.g., by a finger tap on the icon) initiates an alphabetical display of the user's contacts by their first names (not shown);
- Last name icon 806 that when activated (e.g., by a finger tap on the icon) initiates an alphabetical display of the user's contacts by their last names (FIG. 6E);
- Alphabet list icons 808 that the user can touch to quickly arrive at a particular first letter in the displayed contact list; and
- Cancel icon 810 that when activated (e.g., by a finger tap on the icon) initiates transfer back to the previous UI (e.g., UI 3400A).

Figure 6D:
Figure 6E:
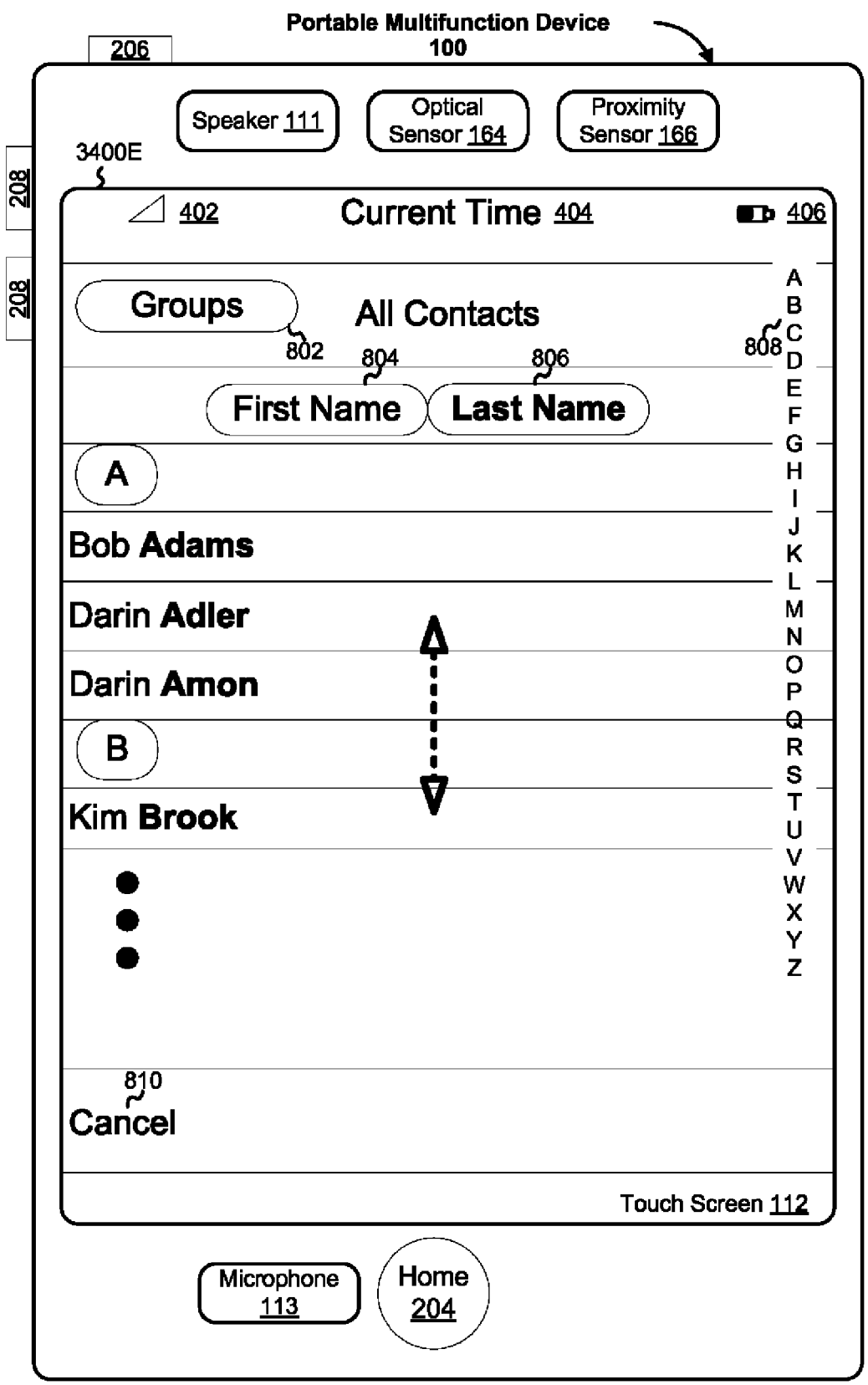

In some embodiments, the user may also enter the email address using one or more keyboards (e.g., 616 (FIG. 6B) and 624 (FIG. 6C)). Keyboard 624 is displayed in response to activation of selector icon 618 (e.g., by a finger tap on the icon); subsequent activation of selector icon 626 initiates display of keyboard 616 again. Activation of shift key 628 in UI 3400C (FIG. 6C) initiates display of other keyboards (not shown). The device sends the email message in response to the user activating the send icon 3404 (FIG. 6B) (e.g., by a finger tap on the icon). Alternatively, if the user activates the cancel icon 3402, the device may display a save draft icon (e.g., 1810, FIG. 6D) and a don't save icon (e.g., 1812, FIG. 6D). The device saves the draft if the user activates the save draft icon 1810, e.g., in a drafts folder 3311 (FIG. 5) in email client 140. The device deletes the draft if the user activates the don't save icon 1812 (FIG. 6D).

In some embodiments, in response to the user activating the attach icon 3410 (e.g., by a finger tap on the icon), the touch screen displays a UI for adding attachments (not shown).

Figure 7A:
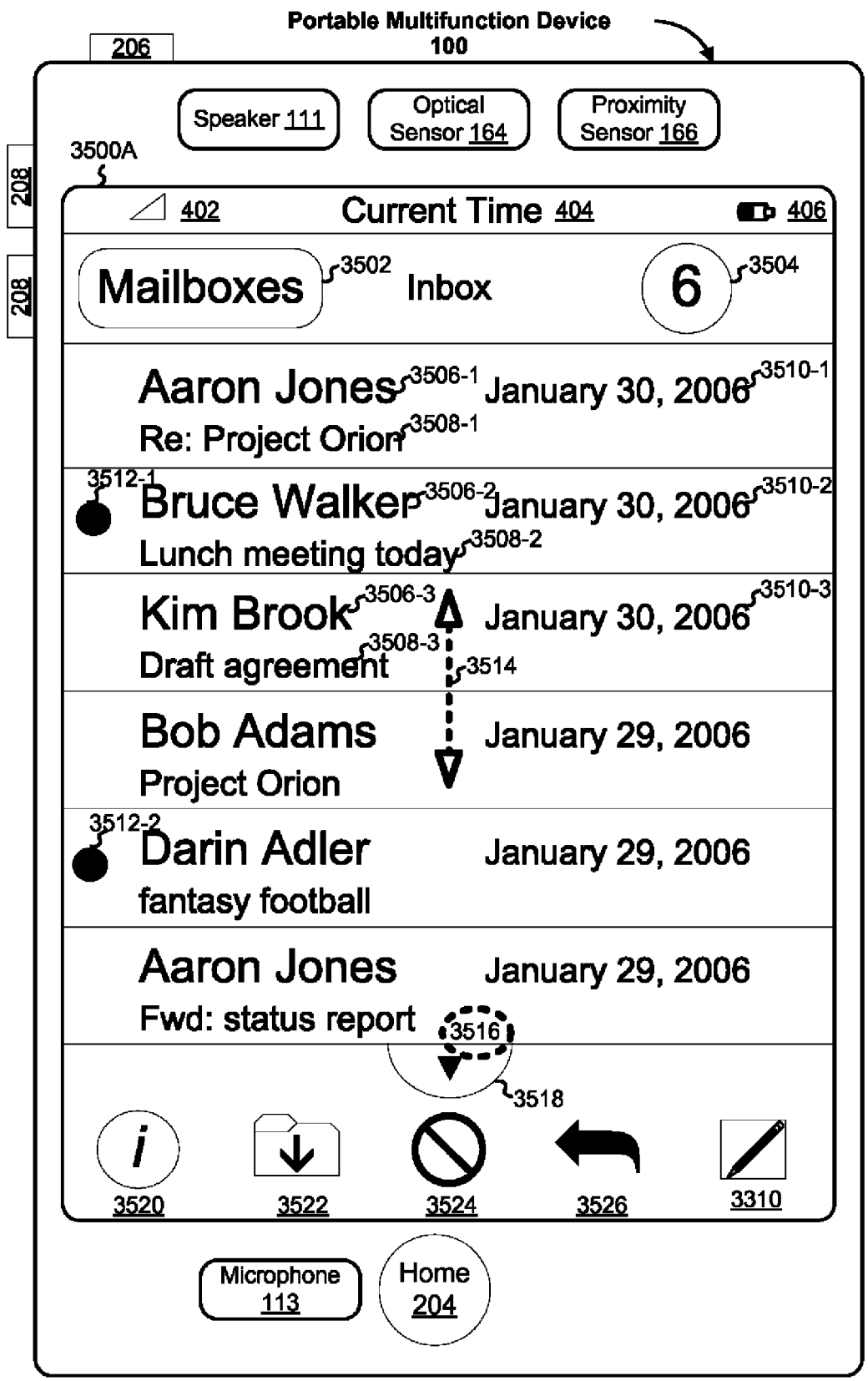
FIGS. 7A-7I illustrate an exemplary user interface for displaying and managing an inbox in accordance with some embodiments.
Figure 7B:
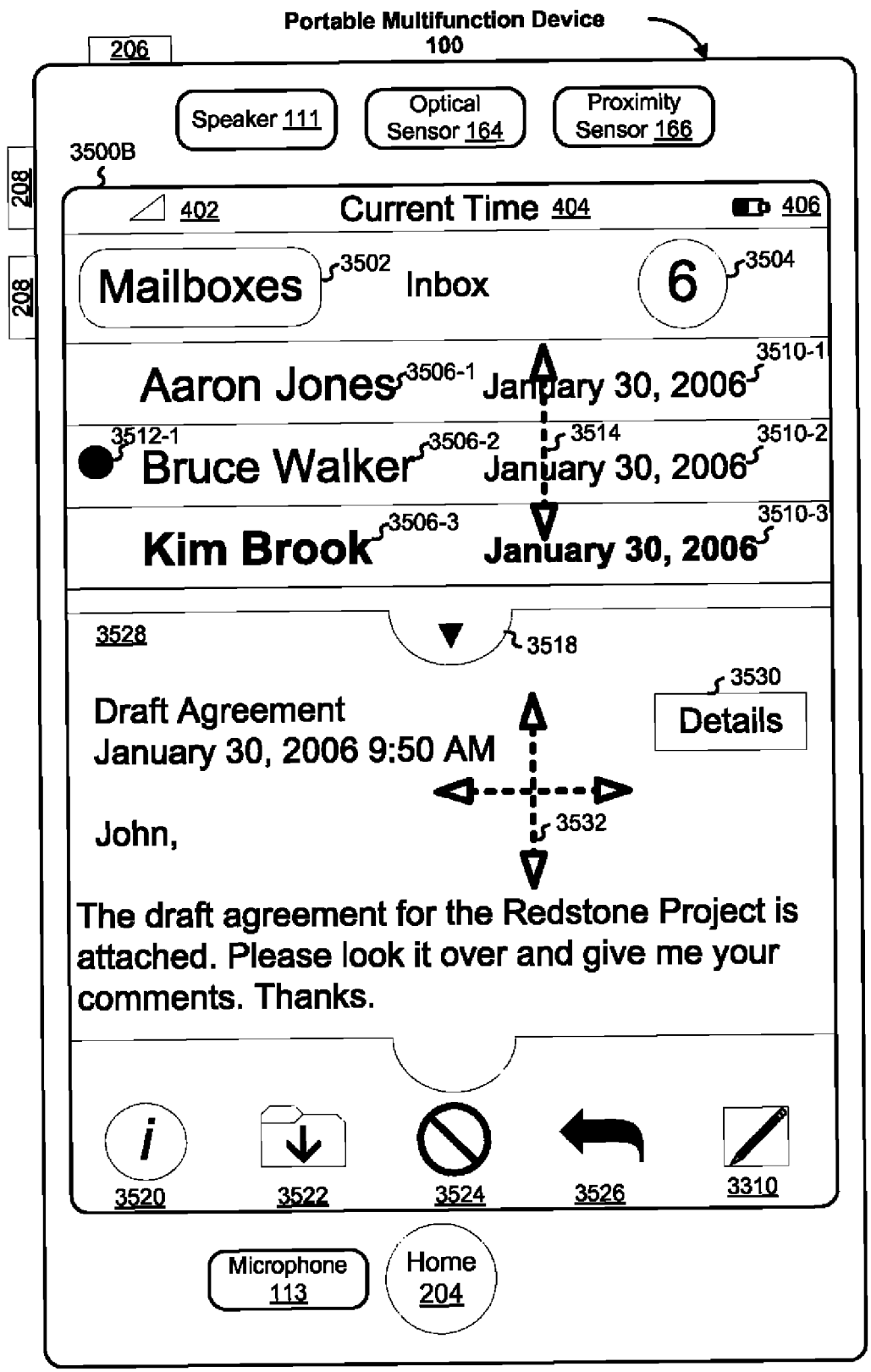
Figure 7C:
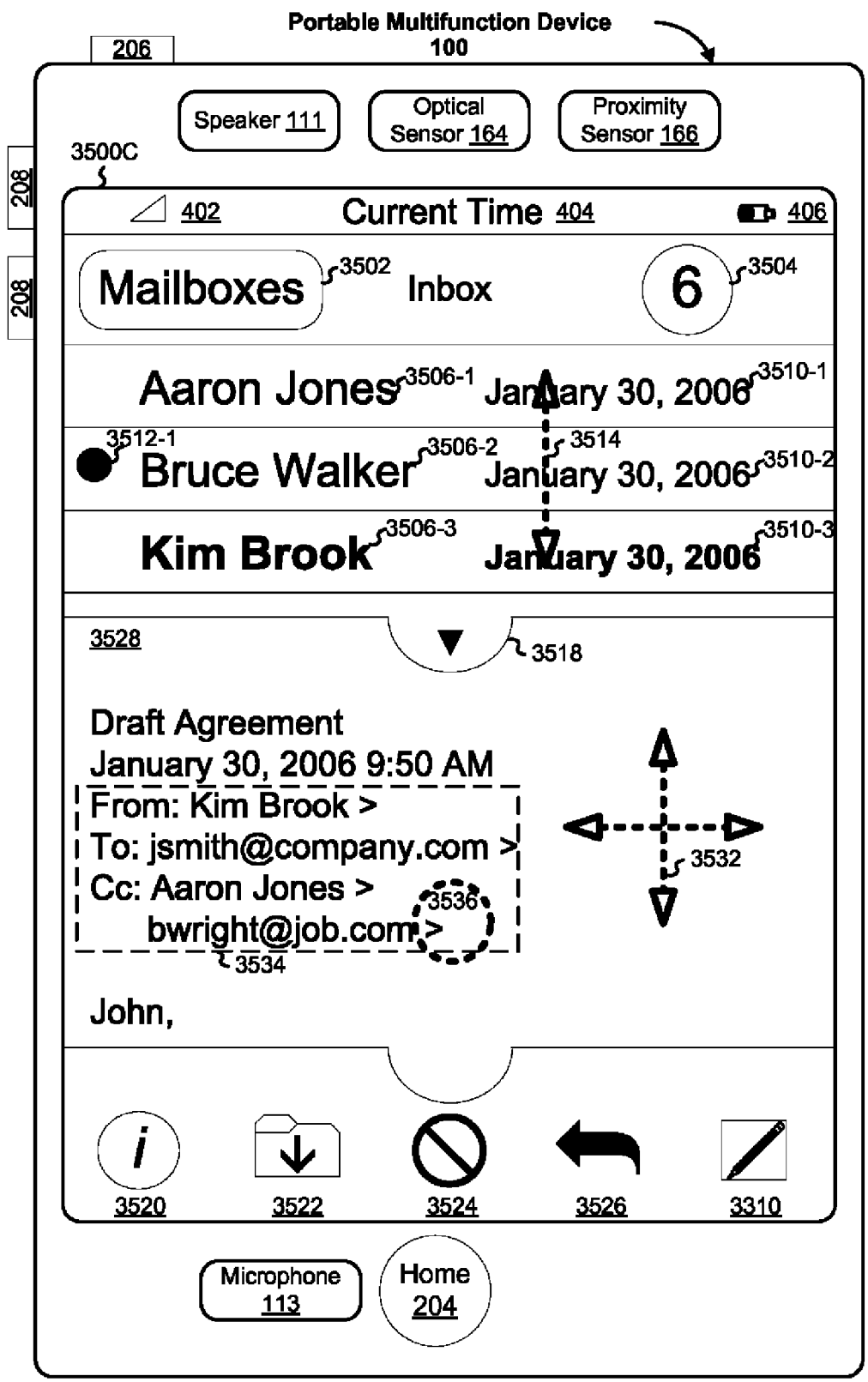
Figure 7D:
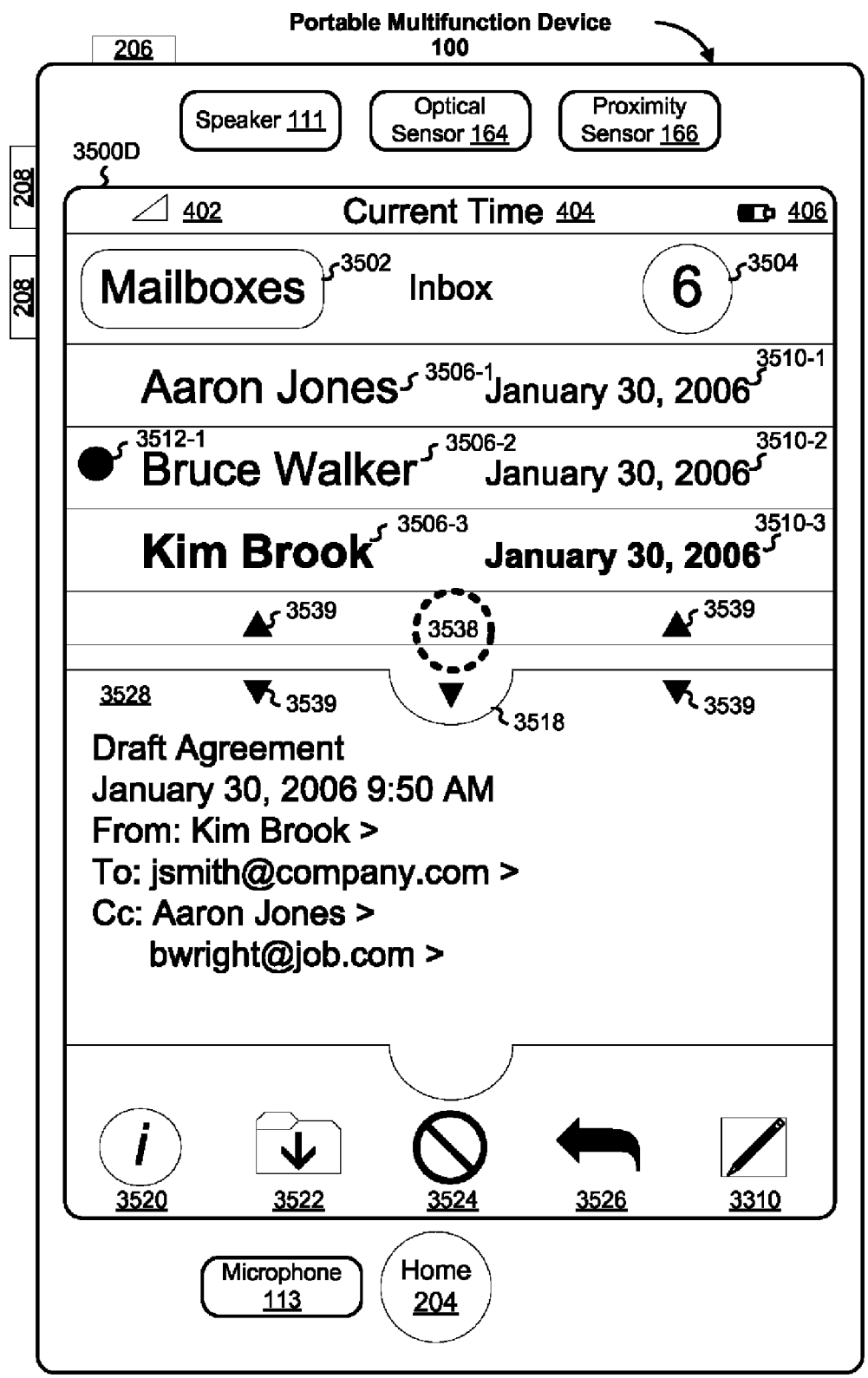
Figure 7E:
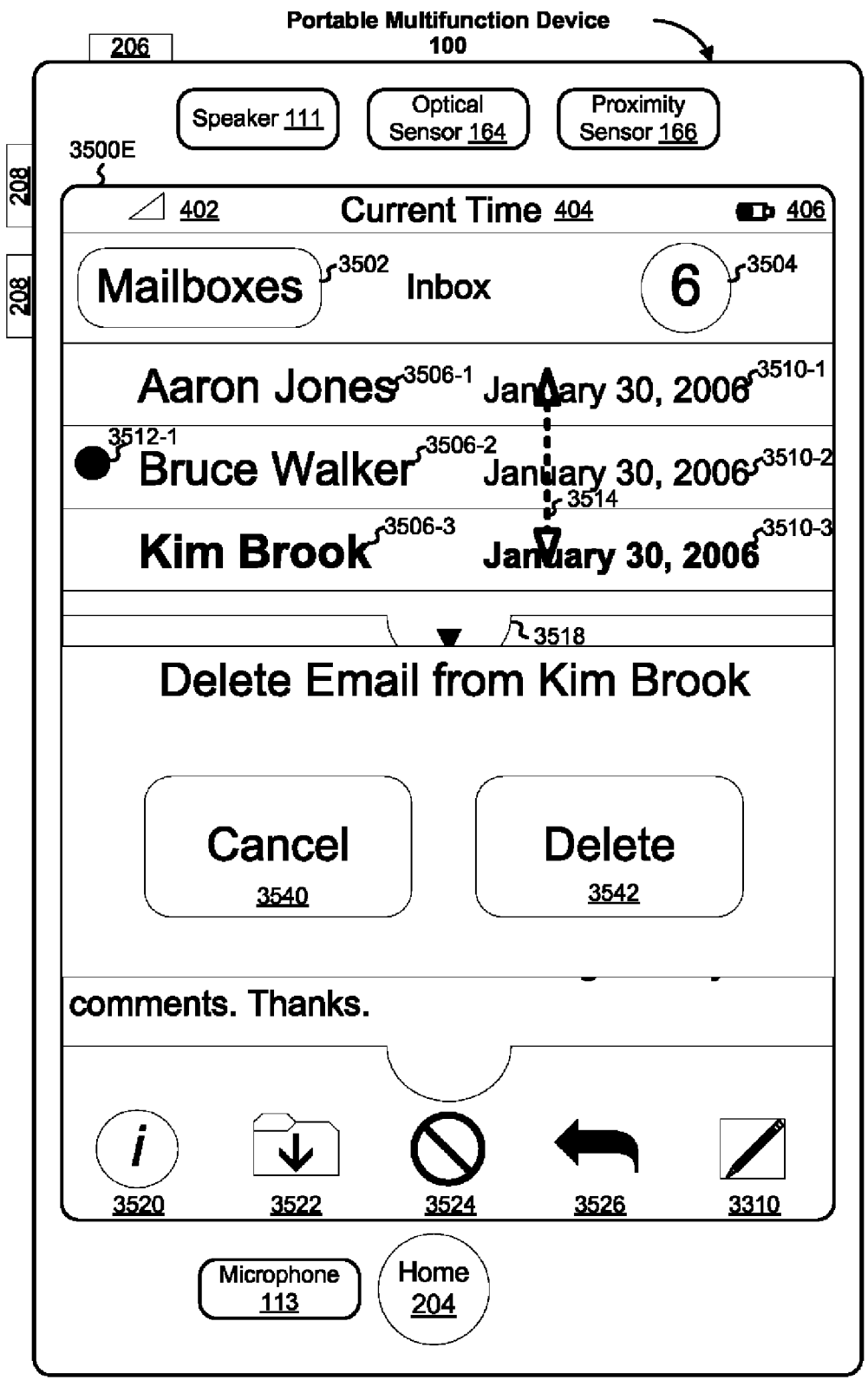
Figure 7F:
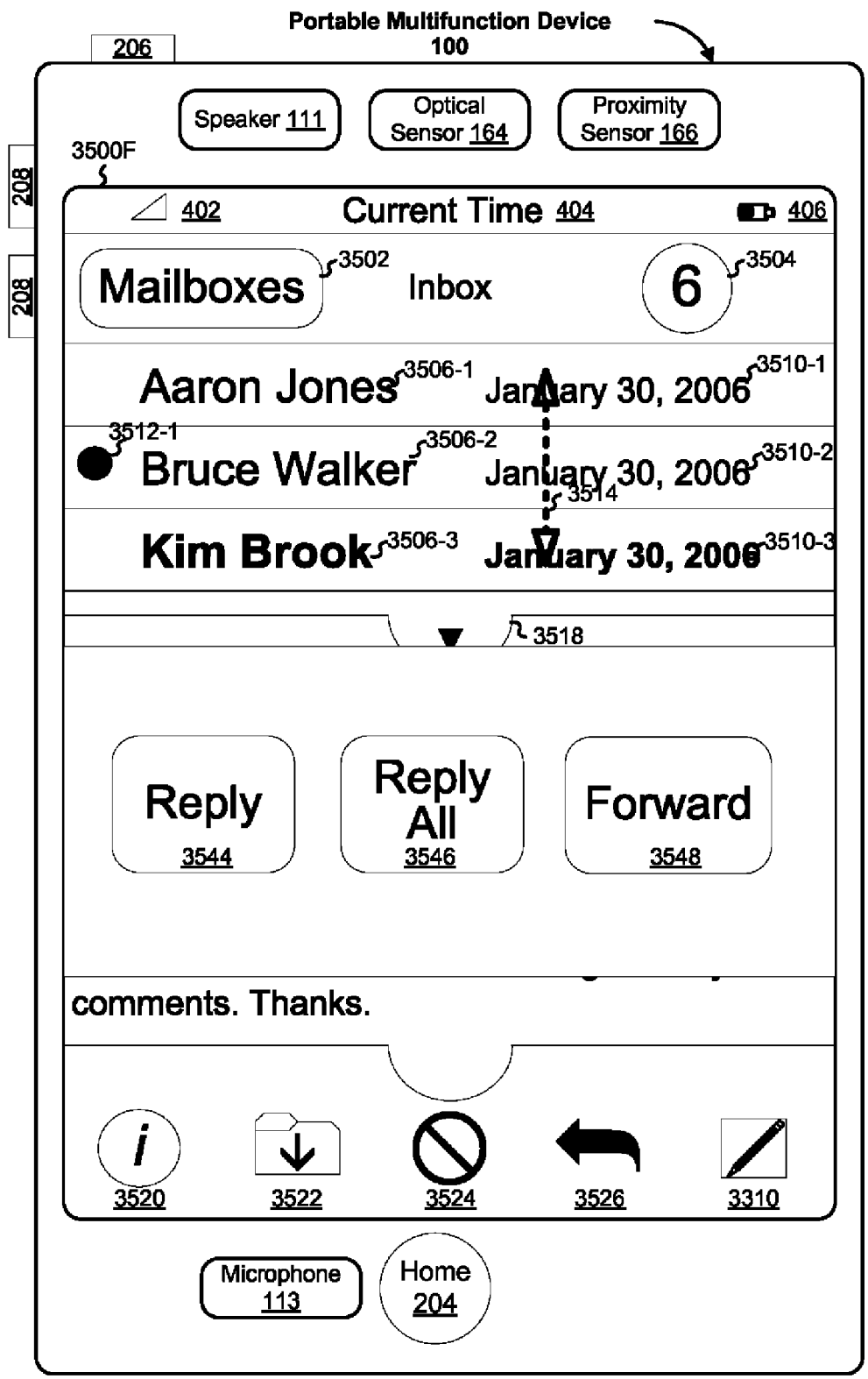
Figure 7G:
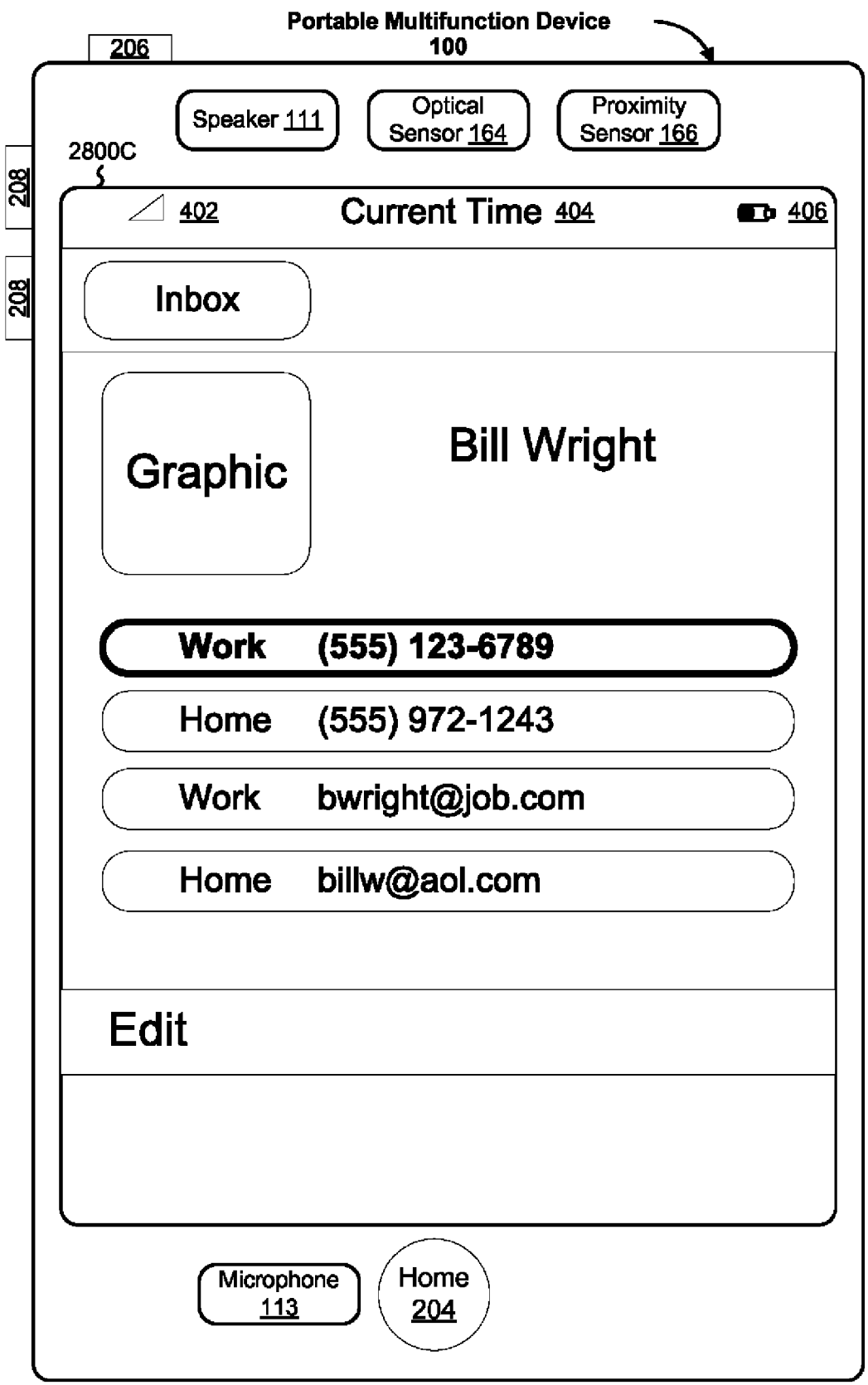
Figure 11A:
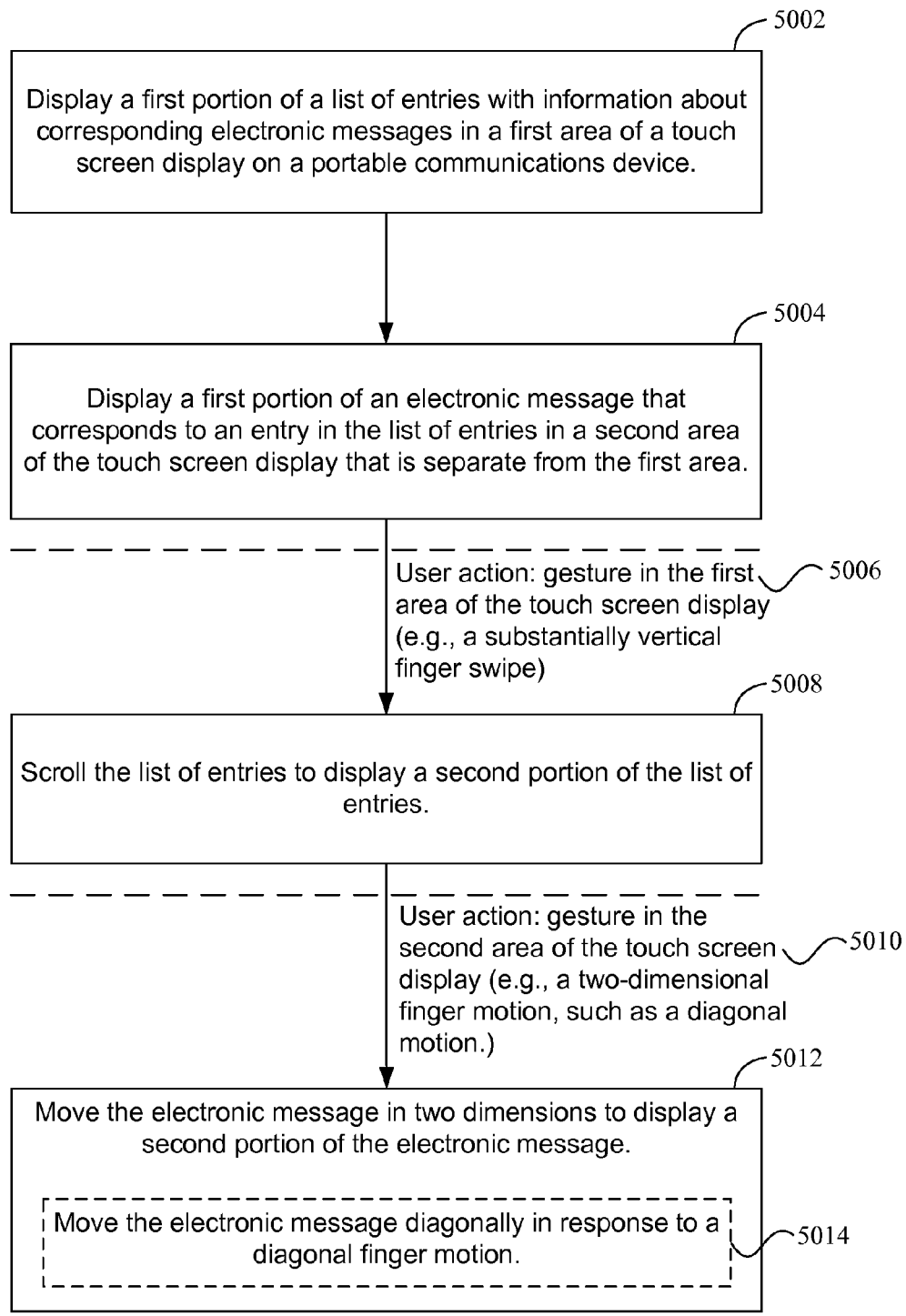
FIGS. 11A-11D are flow diagrams illustrating a process for displaying emails and email lists in accordance with some embodiments.

FIGS. 7A-7I illustrate an exemplary user interface for displaying and managing an inbox of an email client 140 in accordance with some embodiments. An analogous user interface may be used to display and manage the other mailboxes (e.g., drafts, sent, trash, personal, and/or work in UI 3300 (FIG. 5)). In some embodiments, user interfaces 3500A-3500F include the following elements, or a subset or superset thereof:
- 402, 404, 406, and 3310, as described above;
- mailboxes icon 3502 that when activated (e.g., by a finger tap on the icon) initiates the display of mailbox UI 3300 (FIG. 5);
- unread messages icon 3504 that displays the number of unread messages in the inbox;
- names 3506 of the senders of the email messages;
- subject lines 3508 for the email messages;
- dates 3510 of the email messages;
- unread message icons 3512 that indicate messages that have not been opened;
- preview pane separator 3518 that separates the list of messages from a preview of a selected message in the list;
- settings icon 3520 that when activated (e.g., by a finger tap on the icon) initiates the display of settings UI 3600 (FIG. 8);
- move message icon 3522 that when activated (e.g., by a finger tap on the icon) initiates the display of move message UI 3800A (FIG. 10A);
- Delete symbol icon 3524 that when activated (e.g., by a finger tap on the icon) initiates display of a UI to confirm that the user wants to delete the selected email (e.g. UI 3500E, FIG. 7E);
- Reply/Forward icon 3526 that when activated (e.g., by a finger tap on the icon) initiates display of a UI to select how to reply or forward the selected email (e.g. UI 3500F, FIG. 7F);

Preview pane 3528 (FIGS. 7B-7D) that displays a portion of the selected email message;

Details icon 3530 (FIG. 7B) that when activated (e.g., by a finger tap on the icon) initiates display of email addressing details 3534 (FIG. 7C);

Cancel icon 3540 (FIG. 7E) that when activated (e.g., by a finger tap on the icon) returns the device to the previous user interface (e.g. UI 3500D, FIG. 7D);

Delete icon 3542 (FIG. 7E) that when activated (e.g., by a finger tap on the icon) deletes the selected email;

Reply icon 3544 (FIG. 7F) that when activated (e.g., by a finger tap on the icon) initiates creation of an email replying to the sender;

Reply All icon 3546 (FIG. 7F) that when activated (e.g., by a finger tap on the icon) initiates creation of an email replying to the sender and the other parties included in the selected email (e.g., by cc:);

Forward icon 3548 (FIG. 7F) that when activated (e.g., by a finger tap on the icon) initiates creation of an email to be forwarded;

If the set of emails fills more than the screen area (or more than the screen area above the preview pane 3528), the user may scroll through the emails using vertically upward and/or vertically downward gestures 3514 on the touch screen. Scrolling through the emails is further described below with regards to process 5000 (FIG. 11A).

As shown in FIG. 7B, if the preview pane is sufficiently large, it may show an initial portion of the selected email message, from the body of the email message. In some embodiments, the displayed text from the body of the email message is text that has been extracted by the email client 140 from the HTML version of the selected message. Thus, if the email message body has both plain text and HTML portions, the portion used for generating the preview is the HTML portion. Alternately, instead of displaying a preview pane, in the list of email messages each item (representing a respective email message) may include (in addition to the sender name, date of receipt, subject, etc.) one or more text body lines extracted by the email client 140 from the HTML portion (if any) of the body of the respective email message.

In some embodiments, the email subjects 3508 are not displayed if the preview pane 3528 is used, or, alternatively, if the preview pane 3528 occupies more than a predefined portion of the displayed user interface (e.g., UI 3500B). In some embodiments, the position of the preview pane separator 3518 can be adjusted by the user making contact 3516 (FIG. 7A) at or near the preview pane separator 3518 and moving the separator to the desired location by dragging the finger contact 3538 (FIG. 7D). Adjustment of the preview pane separator position is further described below with regards to process 5040 (FIG. 11C). In some embodiments, arrows 3539 (FIG. 7D) or other graphics appear during the positioning of the preview pane separator 3518 (e.g., UI 3500D, FIG. 7D) to help guide the user.

Figure 11B:
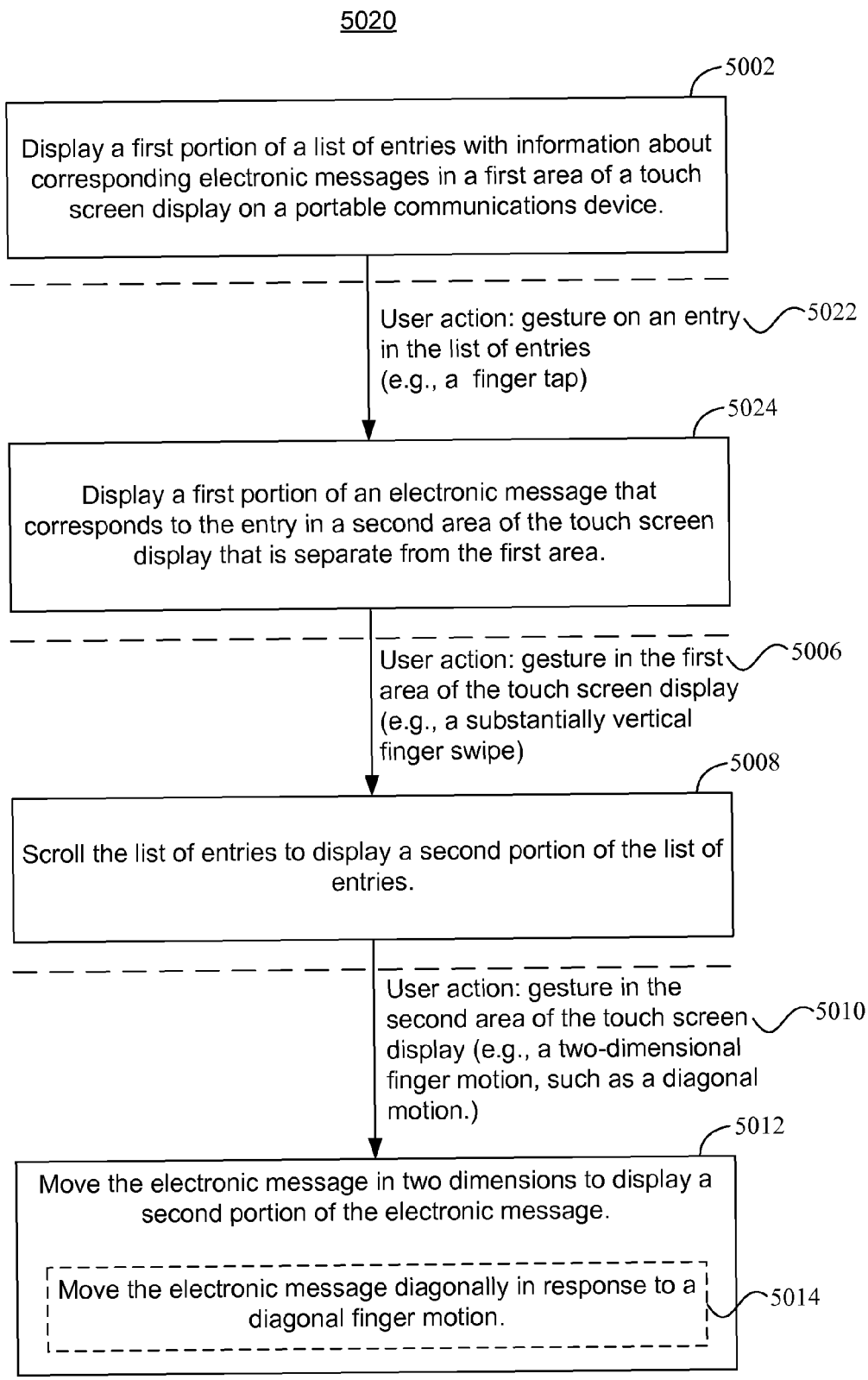
Figure 11C:
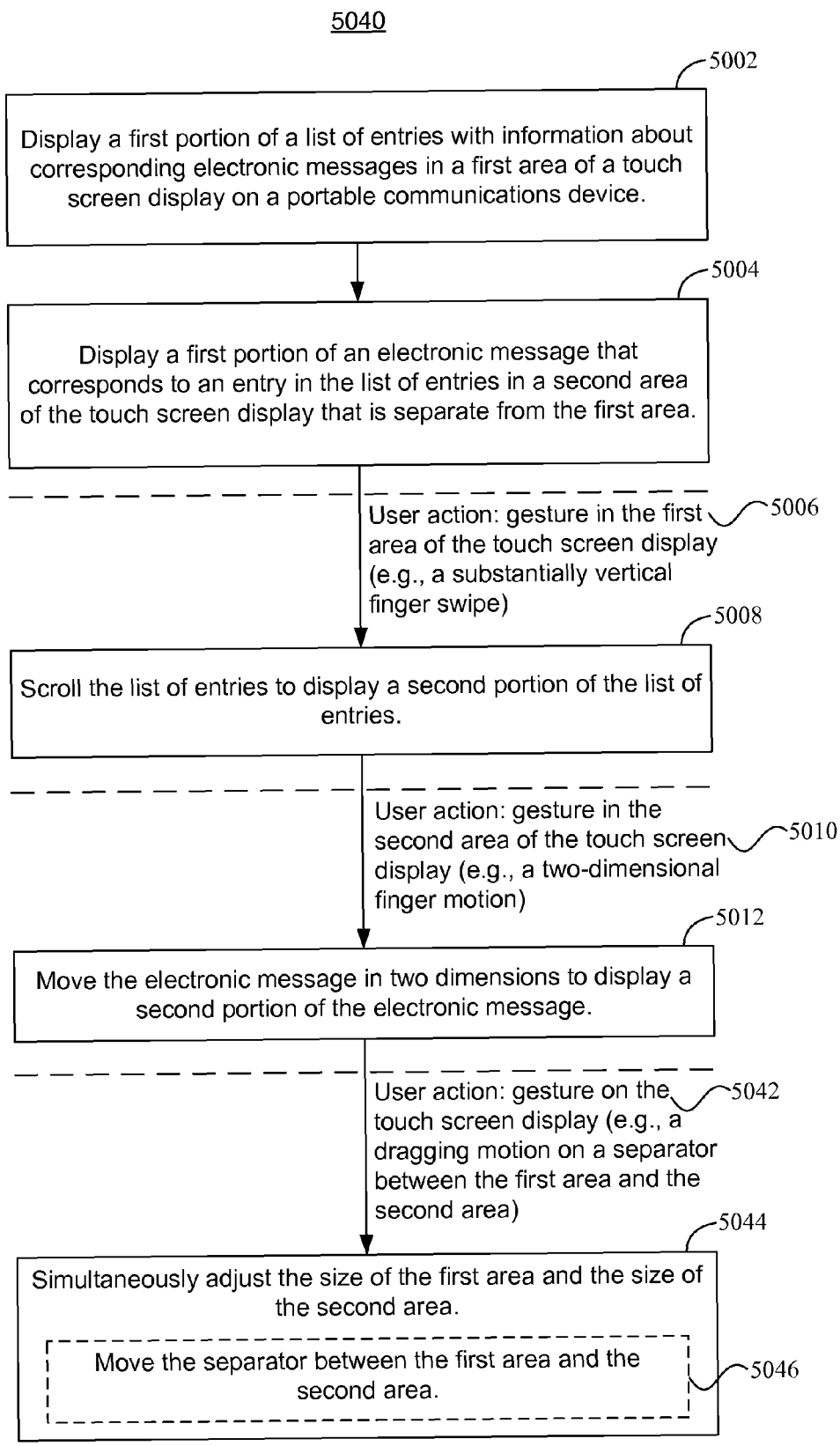

In some embodiments, in response to a tap or other predefined gesture by the user in a row containing information (e.g., 3506, 3510, and/or 3508) about a particular email message, some or all of the text in the row is highlighted (e.g., by coloring, shading, or bolding) and the corresponding message is displayed in the preview pane area 3528, as further described below with regards to process 5020 (FIG. 11B). In some embodiments, in response to a tap or other predefined gesture by the user in a row containing information (e.g., 3506, 3510, and/or 3508) about a particular email message, the email message is displayed on the full screen if the preview pane 3528 is not being used.

In some embodiments, if the selected email fills more than the preview pane area 3528, the user may scroll through the email using two-dimensional gestures 3532 (FIGS. 7B and 7C) in the preview pane 3528 with vertical and/or horizontal movement of the email on the touch screen, as further described below with regards to process 5000 (FIG. 11A).

Figure 7H:

In some embodiments, in response to user activation of an additional information icon (e.g., ">") on the detail information 3534 (e.g., by a finger tap 3536 (FIG. 7C) on the icon), the touch screen may display contact list information for the corresponding party, if available (e.g., UI 3500G, FIG. 7G) or a UI such as UI 3500H, FIG. 7H.

Figure 7I:
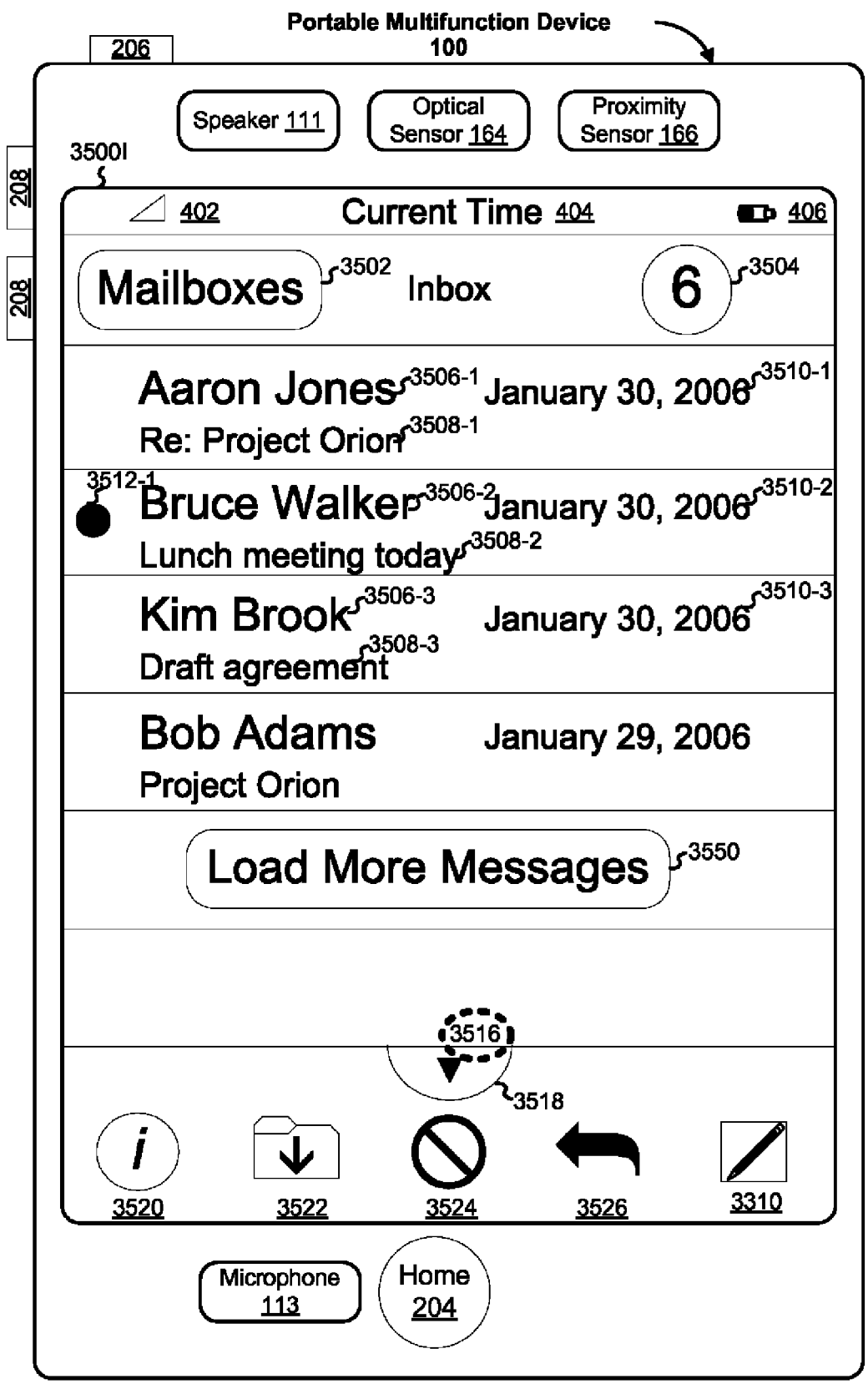

In some embodiments, a "Load More Messages" button 3550 appears in line with the list of email messages (UI 3500I; FIG. 7I), at the location in the list where more messages would appear if more messages were available. User selection of button 3550 causes additional email messages to be downloaded to the portable multifunction device. Displaying "Load More Messages" button 3550 at the location in the list where more messages would appear is intuitive and saves space in the UI for other buttons.

Figure 8:
FIG. 8 illustrates an exemplary user interface for setting email user preferences in accordance with some embodiments.
Figure 9A:
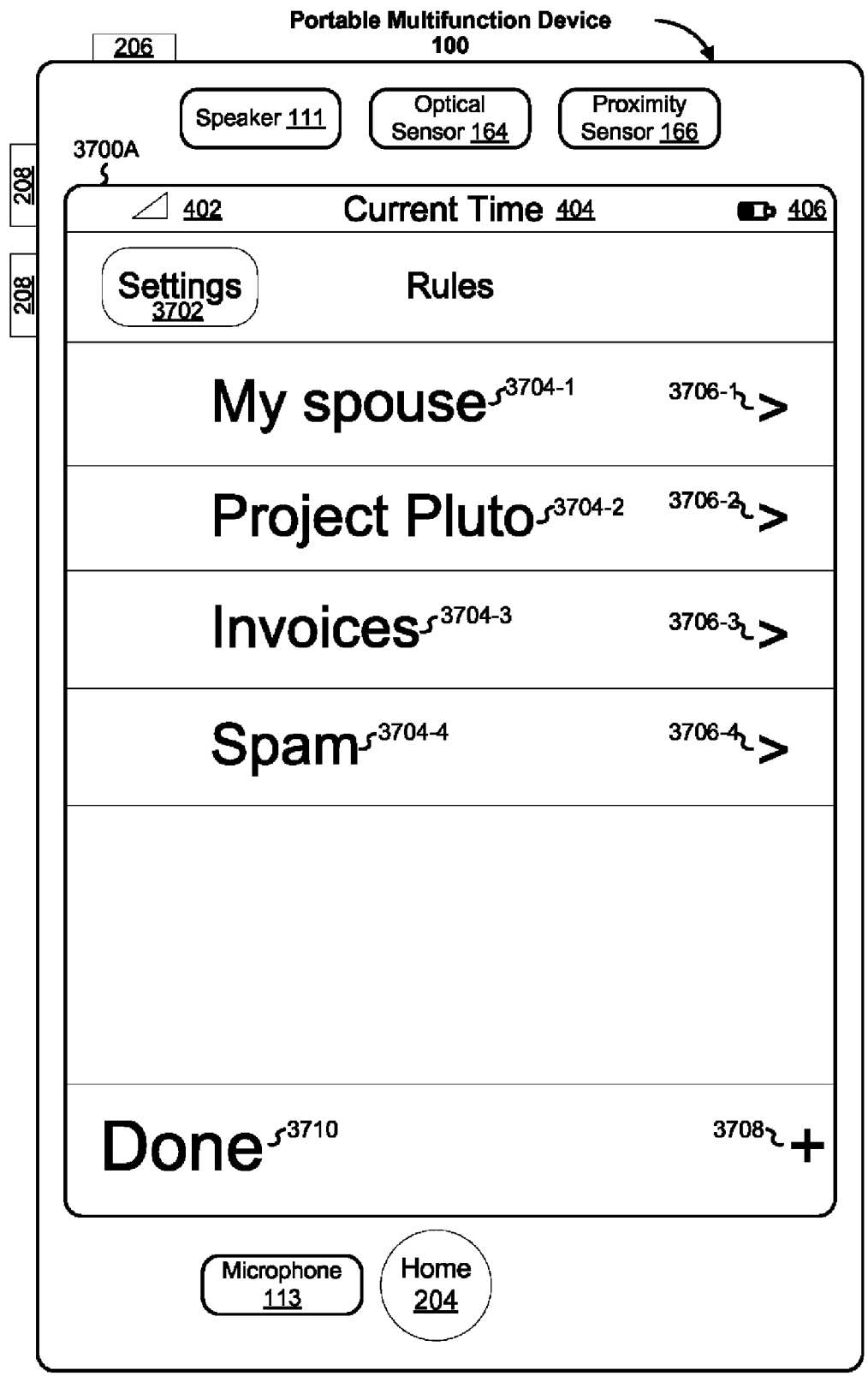
FIGS. 9A and 9B illustrate an exemplary user interface for creating and managing email rules in accordance with some embodiments.
Figure 9B:

FIG. 8 illustrates an exemplary user interface for setting email user preferences in accordance with some embodiments. In some embodiments, user interface 3600 includes the following elements, or a subset or superset thereof:

402, 404, and 406, as described above;

Done icon 3602 that when activated (e.g., by a finger tap on the icon) returns the device to the previous UI;

Accounts 3604 for entering email account information;

Message list displays 3606 for selecting whether sender 3506 and/or subject 3508 information is displayed in the emails lists;

Display newest messages 3608 for selecting whether the newest messages are displayed at the top or bottom of the screen;

Message display locations 3610 for selecting whether the messages are displayed in the preview pane 3528 or full screen;

Preferred message format 3612 for selecting how the messages are formatted (e.g., HTML or plain text);

Rules 3614 for creating rules for managing email messages (e.g., using UI 3700A, FIG. 9A, and UI 3700B, FIG. 9B);

Selection icons 3616 that when activated (e.g., by a finger tap on the icon) show choices for the corresponding settings.

In some embodiments, a user may tap anywhere in the row for a particular setting to initiate display of the corresponding setting choices.

FIGS. 9A and 9B illustrate an exemplary user interface for creating and managing email rules in accordance with some embodiments. In some embodiments, user interface 3700A includes the following elements, or a subset or superset thereof:

402, 404, and 406, as described above;

Settings icon 3702 that when activated (e.g., by a finger tap on the icon) returns the device to the settings UI 3600 (FIG. 8);

Rules 3704;

Selection icons 3706 that when activated (e.g., by a finger tap on the icon) show choices for the corresponding rules.

Add icon 3708 that when activated (e.g., by a finger tap on the icon) displays a UI for creating a new rule (e.g., UI 3700B, FIG. 9B);

Done icon 3710 that when activated (e.g., by a finger tap on the icon) returns the device to the settings UI 3600 (FIG. 8);

In some embodiments, a user may tap anywhere in the row for a particular rule to initiate display of the corresponding rule (e.g., UI 3700B, FIG. 9B).

Figure 10A:
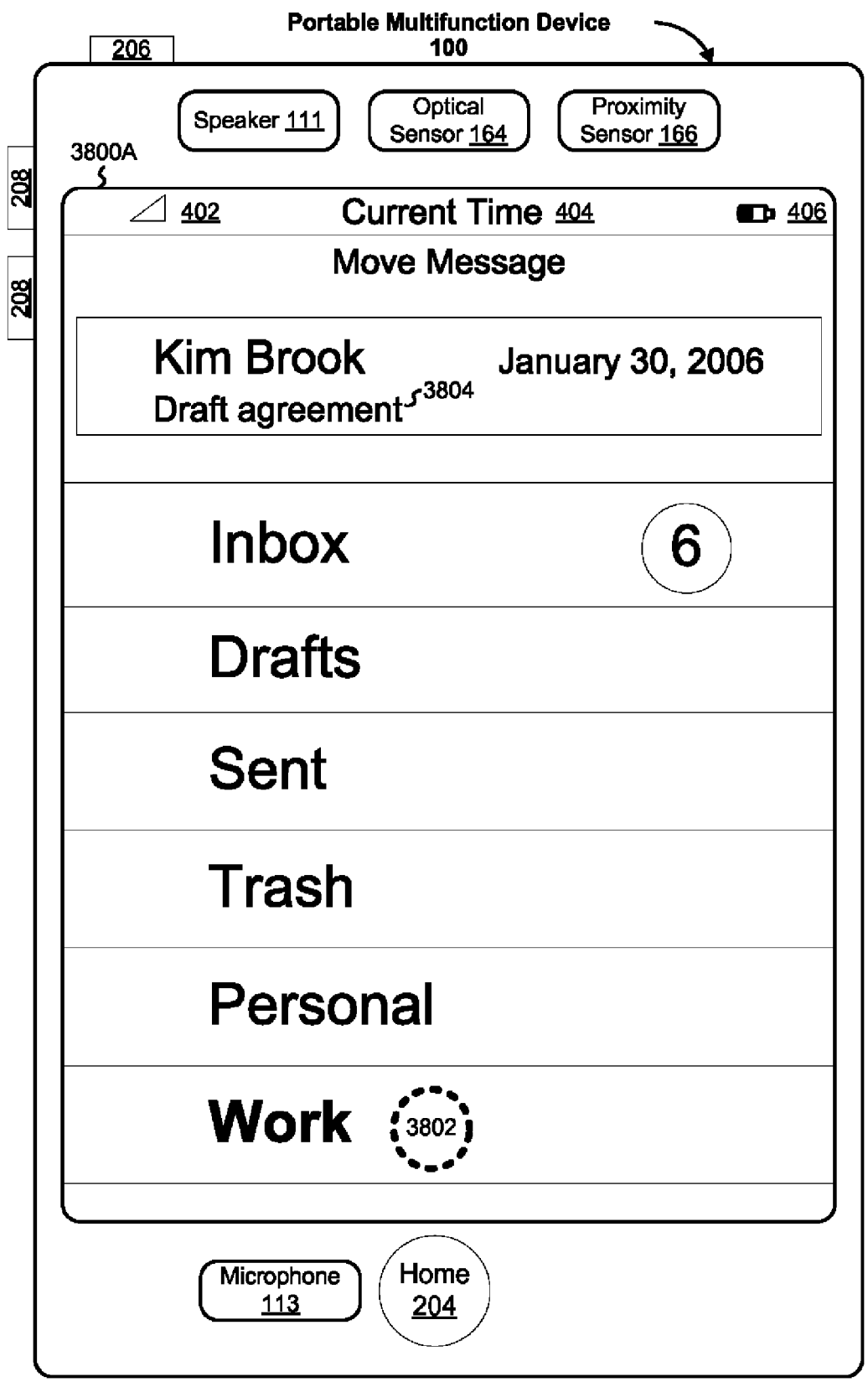
FIGS. 10A and 10B illustrate an exemplary user interface for moving email messages in accordance with some embodiments.
Figure 10B:
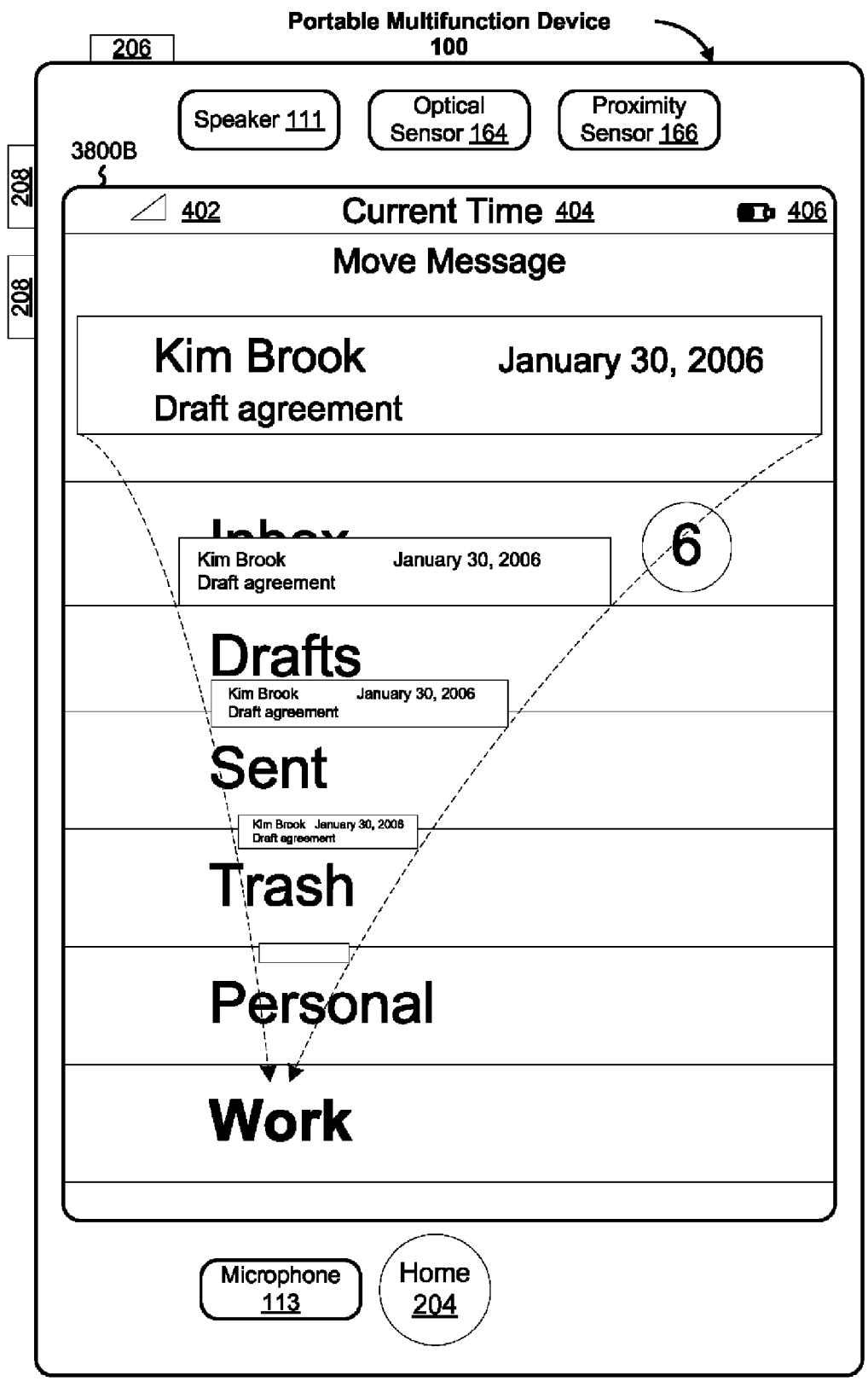

FIGS. 10A and 10B illustrate an exemplary user interface for moving email messages in accordance with some embodiments.

In response to the user activating move message icon 3522 (FIGS. 7A-7F), the device displays UI 3800A, with some information 3804 for the selected message displayed.

In some embodiments, if the user makes a tap 3802 or other predefined gesture on a row corresponding to a particular mailbox or other folder, the message is moved to the corresponding mailbox or folder (e.g., Work in FIG. 10A). In some embodiments, the selected row is highlighted and an animation appears to move the message information 3804 into the selected row (as illustrated schematically in FIG. 10B).

FIG. 11A is a flow diagram illustrating a process 5000 for displaying emails and email lists in accordance with some embodiments. A first portion of a list of entries with information about corresponding electronic messages is displayed in a first area of a touch screen display on a portable communications device (5002). In some embodiments the list of entries corresponds to a mailbox such as inbox 3302 (FIG. 5). In some embodiments the information includes names 3506 and dates 3510 of email messages and unread message icons 3512, as shown in UI 3500B (FIG. 7B).

A first portion of an electronic message that corresponds to an entry in the list of entries is displayed in a second area of the touch screen display that is separate from the first area (5004). In some embodiments the second area is a preview pane such as preview pane 3528 (FIG. 7B).

In response to a gesture 5006 by a user in the first area of the touch screen display, such as a substantially vertical finger swipe, the list of entries is scrolled to display a second portion of the list of entries (5008). For example, vertically upward and/or vertically downward gestures 3514 scroll the email list displayed in the first area of UI 3500B (FIG. 7B). In some embodiments, the gesture 5006 is detected in any portion of the first area of the touch screen display. In some embodiments, the gesture 5006 has a horizontal position within the first area and its detection is independent of the horizontal position within the first area.

In response to a gesture 5010 by a user in the second area of the touch screen display, such as a two dimensional finger motion, the electronic message is moved in two dimensions to display a second portion of the electronic message (5012). For example, two-dimensional gestures 3532 in preview pane 3528 of UI 3500B scroll the displayed email with vertical and/or horizontal movement (FIG. 7B). In some embodiments, the two dimensional finger motion in the second area of the touch screen display is a diagonal motion and the electronic message is moved diagonally (e.g., in a two-dimensional motion corresponding to the two-dimensional finger motion) in response to the diagonal motion (5014). In some embodiments, the gesture 5010 is detected in any portion of the second area of the touch screen display.

Thus, this process provides for fast vertical scrolling through a list of email messages by finger gestures on the list of email messages, while also providing for two dimensional scrolling within a particular email message by corresponding finger gestures on the particular email message. Two dimensional scrolling permits large email messages (e.g., messages with images or other graphics that will not fit without scaling on the touch screen) to be readily viewed on the touch screen of a portable communications device.

FIG. 11B is a flow diagram illustrating a process 5020 for displaying emails and email lists in accordance with some embodiments. A first portion of a list of entries with information about corresponding electronic messages is displayed in a first area of a touch screen display on a portable communications device (5002), as described above with regards to FIG. 11A. In response to a gesture 5022 by a user on an entry in the list of entries, the first portion of an electronic message that corresponds to the entry is displayed in a second area of the touch screen display that is separate from the first area (5024). In some embodiments, the gesture 5022 is a finger tap in a row containing information about a particular message, such as a row containing information 3506 and 3510 (FIG. 7B). In some embodiments, the gesture 5022 is another predefined gesture. Subsequent steps in process 5020 are described above with regards to FIG. 11A.

FIG. 11C is a flow diagram illustrating a process 5040 for displaying emails and email lists in accordance with some embodiments. Steps 5002-5012 are described above with regards to FIG. 11A. In response to a gesture 5042 by a user on the touch screen display, the size of the first area and the size of the second area are simultaneously adjusted (5044). In some embodiments, the gesture 5042 is a dragging motion on a separator between the first area and the second area, such as separator 3518 (FIG. 7B). The sizes of the first area and the second area are simultaneously adjusted by moving the separator between the first area and the second area (5046). This process permits a user to use a finger gesture to easily adjust the desired size of the list of email messages and desired size of the particular email message being displayed.

Figure 11D:
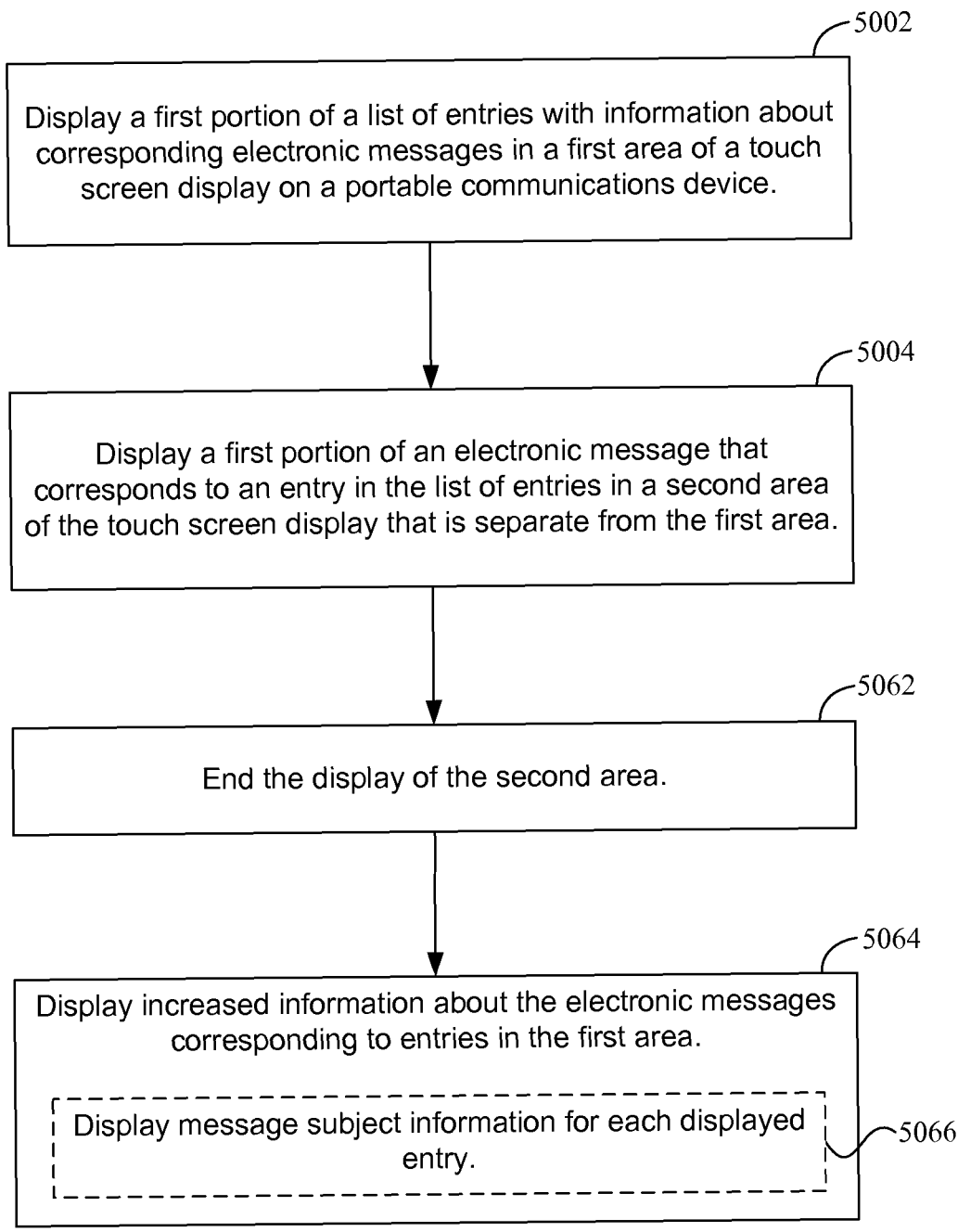

FIG. 11D is a flow diagram illustrating a process 5060 for displaying emails and email lists in accordance with some embodiments. A first portion of a list of entries with information about corresponding electronic messages is displayed in a first area of a touch screen display on a portable communications device (5002). A first portion of an electronic message that corresponds to an entry in the list of entries is displayed in a second area of the touch screen display that is separate from the first area (5004). Display of the second area is ended (5062). In some embodiments, display of the second area is ended by dragging a separator such as separator 3518 to decrease the size of the second area until the second area is no longer displayed, as shown in FIG. 7A. In response, increased information is displayed about the electronic messages corresponding to entries in the first area (5064). In some embodiments, message subject information is displayed for each displayed entry (5066). For example, subject information 3508 is displayed for each entry in UI 3500A (FIG. 7A). This process permits a user to use a finger gesture to easily adjust whether a preview pane is displayed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a portable communications device with a touch screen display:

in a first area of the touch screen display, displaying a
first portion of a list of entries,
wherein a respective entry displays subject information for
a corresponding electronic message;
detecting a first gesture on the touch screen display;
in response to detecting the first gesture:
creating a preview area in a second area of the touch
screen display that is separate from the first area,
displaying a first portion of an electronic message that
corresponds to an entry in the list of entries in the
preview area,
maintaining display of at least a portion of the list of
entries, and
ceasing to display subject information for entries in
the list of entries;
in response to detecting a second gesture by a user in the
first area of the touch screen display, scrolling the list
of entries to display a second portion of the list of
entries; and
in response to detecting a third gesture by the user, the
third gesture including simultaneous movement of the
user's finger in two dimensions, in the second area of
the touch screen display, simultaneously moving the
electronic message in two dimensions to display a
second portion of the electronic message in accordance with the movement of the user's finger.

2. The method of claim 1, wherein the second gesture is a swipe by the user's finger in a substantially vertical direction.

3. The method of claim 1, wherein the electronic message displayed in the second area is displayed in response to a fourth gesture by the user on an entry in the list of entries.

4. The method of claim 3, wherein the fourth gesture is a tap by the user's finger on the entry corresponding to the electronic message displayed in the second area.

5. The method of claim 1, wherein the third gesture is a two-dimensional motion of the user's finger in the second area of the touch screen display that results in a corresponding two-dimensional motion of the electronic message.

6. The method of claim 5, wherein the two-dimensional motion of the user's finger is a diagonal motion that results in a corresponding diagonal motion of the electronic message.

7. The method of claim 1, including simultaneously adjusting the size of the first area and the size of the second area with a fifth gesture on the touch screen display.

8. The method of claim 7, wherein the fifth gesture is a dragging motion by the user's finger on a separator between the first area and the second area that moves the separator.

9. The method of claim 8, including, responding to a predefined instance of the fifth gesture by ceasing to display the second area and increasing, for each entry in the list of entries, the information displayed in the first area about the corresponding electronic message.

10. The method of claim 9, wherein the increase in displayed information is the addition of message subject information to each displayed entry in the list of entries.

11. The method of claim 1, including:
in response to detecting a gesture:
ending display of the second area, and
displaying in the first area, for each entry in the list of
entries, increased information about the corresponding electronic message, wherein the increased information is the addition of message subject information
about the corresponding electronic message.

12. The method of claim 1, wherein the second area is a preview pane.

13. The method of claim 1, including detecting the second gesture in any portion of the first area of the touch screen display.

14. The method of claim 1, including detecting the second gesture in the first area of the touch screen display, wherein the second gesture has a horizontal component within the first area and the detecting is independent of the horizontal component of the gesture within the first area.

15. The method of claim 1, including detecting the third gesture in any portion of the second area of the touch screen display.

16. A graphical user interface on a portable communications device with a touch screen display, comprising:
a first area of the touch screen display that displays a first
portion of a list of entries, wherein a respective entry
displays subject information for a corresponding electronic message; and
wherein, in response to detecting a first gesture:
a preview area is created in a second area of the touch
screen display that is separate from the first area,
a first portion of an electronic message is displayed that
corresponds to an entry in the list of entries in the
preview area,
display of at least a portion of the list of entries is maintained, and
display of subject information for entries in the list
entries is ceased;
wherein, in response to detecting a second gesture by a user
in the first area of the touch screen display, the list of
entries is scrolled to display a second portion of the list
of entries; and
wherein, in response to detecting a third gesture by the
user, the third gesture including simultaneous movement of the user's finger in two dimension, in the second
area of the touch screen display, the electronic message
simultaneously moves in two dimensions to display a
second portion of the electronic message in accordance
with the movement of the user's finger.

17. A portable communications device, comprising:
a touch screen display;
one or more processors;
memory; and
one or more programs, wherein the one or more programs
are stored in the memory and configured to be executed
by the one or more processors, the one or more programs
including instructions for:
displaying, in a first area of the touch screen display, a
first portion of a list of entries, wherein a respective
entry displays subject information for a corresponding electronic message;
detecting a first gesture on the touch screen display;
in response to detecting the first gesture:
creating a preview area in a second area of the touch
screen display that is separate from the first area,
displaying a first portion of an electronic message that
corresponds to an entry in the list of entries in the
preview area,
maintaining display of at least a portion of the list of
entries, and
ceasing to display subject information for entries in
the list of entries;
scrolling the list of entries, in response to detecting a
second gesture by a user in the first area of the touch
screen display, to display a second portion of the list
of entries; and
simultaneously moving the electronic message in two
dimensions, in response to detecting a third gesture by the user, the third gesture including simultaneous movement of the user's finger in two dimensions, in the second area of the touch screen display, to display a second portion of the electronic message in accordance with the movement of the user's finger.

18. A non-transitory computer readable storage medium storing one or more programs, the one or more programs comprising instructions, which when executed by a portable electronic device with a touch-sensitive display, cause the portable electronic device to:
    display, in a first area of the touch screen display, a first portion of a list of entries, wherein a respective entry displays subject information for a corresponding electronic message;
    detect a first gesture on the touch screen display;
    in response to detection of the first gesture:
        create a preview area in a second area of the touch screen display that is separate from the first area,
        display a first portion of an electronic message that corresponds to an entry in the list of entries in the preview area,
        maintain display of at least a portion of the list of entries, and
        cease to display subject information for entries in the list of entries;
    scroll the list of entries, in response to detecting a second gesture by a user in the first area of the touch screen display, to display a second portion of the list of entries; and
    simultaneously move the electronic message in two dimensions, in response to detecting a third gesture by the user, the third gesture including simultaneous movement of the user's finger in two dimensions, in the second area of the touch screen display, to display a second portion of the electronic message in accordance with the movement of the user's finger.

19. The device of claim 17, the one or more programs further including instructions for displaying the electronic message displayed in the second area in response to a fourth gesture by the user on an entry in the list of entries.

20. The device of claim 17, the one or more programs further including instructions for simultaneously adjusting the size of the first area and the size of the second area with a fifth gesture on the touch screen display.

21. The device of claim 17, the one or more programs further including instructions for detecting the second gesture in the first area of the touch screen display, wherein the second gesture has a horizontal component within the first area and the detecting is independent of the horizontal component of the gesture within the first area.

22. The computer readable storage medium of claim 18, wherein the electronic message displayed in the second area is displayed in response to a fourth gesture by the user on an entry in the list of entries.

23. The computer readable storage medium of claim 18, the one or more programs further including instructions which cause the device to simultaneously adjust the size of the first area and the size of the second area with a fifth gesture on the touch screen display.

24. The computer readable storage medium of claim 18, the one or more programs further including instructions which cause the device to detect the second gesture in the first area of the touch screen display, wherein the second gesture has a horizontal component within the first area and the detecting is independent of the horizontal component of the gesture within the first area.

\* \* \* \* \*